United States Patent
Iskra et al.

(10) Patent No.: US 12,522,649 B2
(45) Date of Patent: Jan. 13, 2026

(54) ANTIBODY PURIFICATION

(71) Applicant: PFIZER INC., New York, NY (US)

(72) Inventors: Timothy Iskra, Derry, NH (US); Ashley Margaret Sacramo, Cambridge, MA (US)

(73) Assignee: PFIZER INC., New York, NY (US)

( * ) Notice: Subject to any disclaimer, the term of this patent is extended or adjusted under 35 U.S.C. 154(b) by 6 days.

(21) Appl. No.: 18/393,420

(22) Filed: Dec. 21, 2023

(65) Prior Publication Data

US 2024/0158473 A1 May 16, 2024

Related U.S. Application Data

(63) Continuation of application No. 16/975,994, filed as application No. PCT/IB2019/051498 on Feb. 25, 2019, now abandoned.

(60) Provisional application No. 62/635,943, filed on Feb. 27, 2018.

(51) Int. Cl.
| | |
|---|---|
| *C07K 16/06* | (2006.01) |
| *C07K 1/16* | (2006.01) |
| *C07K 16/28* | (2006.01) |

(52) U.S. Cl.
CPC ............ *C07K 16/065* (2013.01); *C07K 1/165* (2013.01); *C07K 16/2809* (2013.01); *C07K 16/2863* (2013.01); *C07K 16/2878* (2013.01); *C07K 2317/31* (2013.01)

(58) Field of Classification Search
CPC .. C07K 16/065; C07K 1/165; C07K 16/2809; C07K 16/2863; C07K 16/2878; C07K 2317/31
See application file for complete search history.

(56) References Cited

U.S. PATENT DOCUMENTS

| | | | | |
|---|---|---|---|---|
| 2004/0057951 | A1* | 3/2004 | Bednar | A61K 38/49 |
| | | | | 514/17.7 |
| 2005/0107594 | A1 | 5/2005 | Sun et al. | |
| 2016/0297885 | A1* | 10/2016 | Kuo | C07K 16/2878 |
| 2018/0346601 | A1 | 12/2018 | Dettling et al. | |

FOREIGN PATENT DOCUMENTS

| | | |
|---|---|---|
| DE | 4205938 A1 | 9/1993 |
| WO | 2009/017491 A1 | 2/2009 |
| WO | 2015/024896 A1 | 2/2015 |
| WO | 2016/115521 A1 | 7/2016 |
| WO | 2017/021362 A1 | 2/2017 |
| WO | 2017/031476 A2 | 2/2017 |
| WO | 2019/166932 A1 | 9/2019 |

OTHER PUBLICATIONS

Brinkmann and Kontermann, The making of bispecific antibodies, 2017, MABS, vol. 9, No. 2, pp. 182-212 (Year: 2017).

David, L. W., et al., "High-throughput screening of chromatographic separations: III. Monoclonal antibodies on ceramic hydroxyapatite", Biotechnology and Bioengineering, vol. 100, Issue No. 5, Aug. 1, 2008, pp. 839-854.

Franklin, S. G., "Removal of Aggregate from an IgG4 Product Using CHT™ Ceramic Hydroxyapatite Resin", Tech Note—Bulletin 2940, Rev B, Jan. 1, 2015.

Gagnon et al., A Ceramic Hydroxyapatite-Based Purification Platform, 2010, BioProcess International, vol. 4, Issue 2, pp. 1-8 (Year: 2010).

Gagnon, et al., "Monoclonal antibody purification with hydroxyapatite", New Biotechnology, vol. 25, Issue No. 5, Jun. 1, 2009, pp. 287-293.

Harris, R. J., et al., "Processing of C-terminal lysine and arginine residues of proteins isolated from mammalian cell culture", Journal of Chromatography A, vol. 705, Issue No. 1, Jun. 23, 1995, pp. 129-134.

International Preliminary Report on Patentability issued in PCT/IB2019/051498; mailed on Sep. 3, 2020; 16 pp.

International Search Report issued in PCT/IB2019/051498; mailed on May 29, 2019; 10 pp.

Itoh et al., Retention Mechanism of Proteins in Hydroxyapatite Chromatography—Multimodal Interaction Based Protein Separations: A Model Study, 2018, Current Protein and Peptide Science, vol. 20, pp. 75-81 (Year: 2018).

Liu, H., et al., "In vitro and in vivo modifications of recombinant and human IgG antibodies.", MABS 2014, vol. 6, Issue No. 5, 2014, pp. 1145-1154.

Mochizuki, K., et al., "Characterization of a lung cancer—associated human monoclonal antibody HB4C5.", Human Antibodies, vol. 2, Issue. 3, Jul. 1, 1991, pp. 116-123.

Moro, A., et al., "Single-step purification of pepsin-derived monoclonal antibody fragments from crude murine ascitic fluids by ceramic hydroxyapatite high-performance liquid chromatography.", Journal of Biochemistry, vol. 144, Issue No. 6, Dec. 2008, pp. 733-739.

Saito, M., et al., "Separation and analysis of charged isomers of monoclonal immunoglobulin G by ceramic hydroxyapatite chromatography.", Preparative Biochemistry and Biotechnology, vol. 46, Issue. 3, Jan. 1, 2016, pp. 215-221.

Schubert, S., et al., "Investigation of the interaction mechanism of the recombinant human antibody MDJ8 and its fragments with chromatographic apatite phases.", Journal of Chromatography A, vol. 1216, Issue. 18, May 1, 2009, pp. 3831-3840.

(Continued)

*Primary Examiner* — Jeffrey Stucker
*Assistant Examiner* — Brittney E Donoghue
(74) *Attorney, Agent, or Firm* — Susan Wang; Stephen Moyer; Ye Hua

(57) ABSTRACT

Antibody compositions and methods for the purification of antibodies are provided. Purification methods provided involve the use of hydroxyapatite resin (HA) to separate an antibody of interest from one or more impurities.

19 Claims, 7 Drawing Sheets

Specification includes a Sequence Listing.

(56) References Cited

OTHER PUBLICATIONS

Sharp, J. M., et al., "Strategies for enhancing monoclonal antibody accumulation in plant cell and organ cultures.", Biotechnology Progress, vol. 17, No. 6, Nov. 2001, pp. 979-992.
Tarditi, L., Selective High-performance Liquid chromatographic purification of bispecific monoclonal antibodies, Jan. 1, 1992, Journal of Chromatography, 13-20, 599.
Usami, A., et al., "The effect of pH, hydrogen peroxide and temperature on the stability of human monoclonal antibody.", Journal of pharmaceutical and biomedical analysis, vol. 14, Issue. 8-10, Jun. 1, 1996, pp. 1133-1140.
Vlasak and Ionescu, Fragmentation of monoclonal antibodies, 2011, mAbs, vol. 3, Issue 3, pp. 253-263 (Year: 2011).
Wensel et al., High-Throughput Screening of Chromotographic Separations: III. Monoclonal Antibodies on Ceramic Hydroxyapatite, 2008, Biotechnology and Bioengineering, vol. 100, No. 5, pp. 838-854 (Year: 2008).
Written Opinion issued in PCT/IB2019/051498; mailed on May 29, 2019; 14 pp.

\* cited by examiner

BCMA / CD3

Intact

BCMA / CD3

Clipped

SEQUENCE LISTING

Sequence total quantity: 12
SEQ ID NO: 1          moltype = AA  length = 121
FEATURE               Location/Qualifiers
REGION                1..121

```
                            note = Synthetic Construct
source                      1..121
                            mol_type = protein
                            organism = synthetic construct
SEQUENCE: 1
EVQLVESGGG LVQPGGSLRL SCAASGFTFS DYYMTWVRQA PGKGLEWVAF IRNRARGYTS    60
DHNPSVKGRF TISRDNAKNS LYLQMNSLRA EDTAVYYCAR DRPSYYVLDY WGQGTTVTVS   120
S                                                                  121

SEQ ID NO: 2                moltype = AA   length = 447
FEATURE                     Location/Qualifiers
REGION                      1..447
                            note = Synthetic Construct
source                      1..447
                            mol_type = protein
                            organism = synthetic construct
SEQUENCE: 2
EVQLVESGGG LVQPGGSLRL SCAASGFTFS DYYMTWVRQA PGKGLEWVAF IRNRARGYTS    60
DHNPSVKGRF TISRDNAKNS LYLQMNSLRA EDTAVYYCAR DRPSYYVLDY WGQGTTVTVS   120
SASTKGPSVF PLAPCSRSTS ESTAALGCLV KDYFPEPVTV SWNSGALTSG VHTFPAVLQS   180
SGLYSLSSVV TVPSSNFGTQ TYTCNVDHKP SNTKVDKTVE RKCRVRCPRC PAPPVAGPSV   240
FLFPPKPKDT LMISRTPEVT CVVVAVSHED PEVQFNWYVD GVEVHNAKTK PREEQFNSTF   300
RVVSVLTVVH QDWLNGKEYK CKVSNKGLPS SIEKTISKTK GQPREPQVYT LPPSREEMTK   360
NQVSLTCLVK GFYPSDIAVE WESNGQPENN YKTTPPMLDS DGSFFLYSRL TVDKSRWQQG   420
NVFSCSVMHE ALHNHYTQKS LSLSPGK                                      447

SEQ ID NO: 3                moltype = AA   length = 112
FEATURE                     Location/Qualifiers
REGION                      1..112
                            note = Synthetic Contruct
source                      1..112
                            mol_type = protein
                            organism = synthetic construct
SEQUENCE: 3
DIVMTQSPDS LAVSLGERAT INCKSSQSLF NVRSRKNYLA WYQQKPGQPP KLLISWASTR    60
ESGVPDRFSG SGSGTDFTLT ISSLQAEDVA VYYCKQSYDL FTFGSGTKLE IK           112

SEQ ID NO: 4                moltype = AA   length = 219
FEATURE                     Location/Qualifiers
REGION                      1..219
                            note = Synthetic Construct
source                      1..219
                            mol_type = protein
                            organism = synthetic construct
SEQUENCE: 4
DIVMTQSPDS LAVSLGERAT INCKSSQSLF NVRSRKNYLA WYQQKPGQPP KLLISWASTR    60
ESGVPDRFSG SGSGTDFTLT ISSLQAEDVA VYYCKQSYDL FTFGSGTKLE IKRTVAAPSV   120
FIFPPSDEQL KSGTASVVCL LNNFYPREAK VQWKVDNALQ SGNSQESVTE QDSKDSTYSL   180
SSTLTLSKAD YEKHKVYACE VTHQGLSSPV TKSFNRGEC                          219

SEQ ID NO: 5                moltype = AA   length = 115
FEATURE                     Location/Qualifiers
REGION                      1..115
                            note = Synthetic Construct
source                      1..115
                            mol_type = protein
                            organism = synthetic construct
SEQUENCE: 5
EVQLLESGGG LVQPGGSLRL SCAASGFTFS SYPMSWVRQA PGKGLEWVSA IGGSGGSLPY    60
ADIVKGRFTI SRDNSKNTLY LQMNSLRAED TAVYYCARYW PMDIWGQGTL VTVSS        115

SEQ ID NO: 6                moltype = AA   length = 441
FEATURE                     Location/Qualifiers
REGION                      1..441
                            note = Synthetic Construct
source                      1..441
                            mol_type = protein
                            organism = synthetic construct
SEQUENCE: 6
EVQLLESGGG LVQPGGSLRL SCAASGFTFS SYPMSWVRQA PGKGLEWVSA IGGSGGSLPY    60
ADIVKGRFTI SRDNSKNTLY LQMNSLRAED TAVYYCARYW PMDIWGQGTL VTVSSASTKG   120
PSVFPLAPCS RSTSESTAAL GCLVKDYFPE PVTVSWNSGA LTSGVHTFPA VLQSSGLYSL   180
SSVVTVPSSN FGTQTYTCNV DHKPSNTKVD KTVERKCEVE CPECPAPPVA GPSVFLFPPK   240
PKDTLMISRT PEVTCVVVAV SHEDPEVQFN WYVDGVEVHN AKTKPREEQF NSTFRVVSVL   300
TVVHQDWLNG KEYKCKVSNK GLPSSIEKTI SKTKGQPREP QVYTLPPSRE EMTKNQVSLT   360
CEVKGFYPSD IAVEWESNGQ PENNYKTTPP MLDSDGSFFL YSKLTVDKSR WQQGNVFSCS   420
VMHEALHNHY TQKSLSLSPG K                                            441

SEQ ID NO: 7                moltype = AA   length = 108
```

```
FEATURE                 Location/Qualifiers
REGION                  1..108
                        note = Synthetic Construct
source                  1..108
                        mol_type = protein
                        organism = synthetic construct
SEQUENCE: 7
EIVLTQSPGT LSLSPGERAT LSCRASQSVS SSYLAWYQQK PGQAPRLLMY DASIRATGIP    60
DRFSGSGSGT DFTLTISRLE PEDFAVYYCQ QYQSWPLTFG QGTKVEIK                108

SEQ ID NO: 8            moltype = AA  length = 215
FEATURE                 Location/Qualifiers
REGION                  1..215
                        note = Synthetic Construct
source                  1..215
                        mol_type = protein
                        organism = synthetic construct
SEQUENCE: 8
EIVLTQSPGT LSLSPGERAT LSCRASQSVS SSYLAWYQQK PGQAPRLLMY DASIRATGIP    60
DRFSGSGSGT DFTLTISRLE PEDFAVYYCQ QYQSWPLTFG QGTKVEIKRT VAAPSVFIFP   120
PSDEQLKSGT ASVVCLLNNF YPREAKVQWK VDNALQSGNS QESVTEQDSK DSTYSLSSTL   180
TLSKADYEKH KVYACEVTHQ GLSSPVTKSF NRGEC                              215

SEQ ID NO: 9            moltype = AA  length = 124
FEATURE                 Location/Qualifiers
REGION                  1..124
                        note = Synthetic Construct
source                  1..124
                        mol_type = protein
                        organism = synthetic construct
SEQUENCE: 9
EVQLLESGGG LVQPGGSLRL SCAASGFTFS SYAMNWVRQA PGKGLEWVSA ISGGGRSTYY    60
ADSVKGRFTI SRDNSKNTLY LQMNSLRAED TAVYYCARDL SPSDVGWGYG FDIWGQGTLV   120
TVSS                                                                124

SEQ ID NO: 10           moltype = AA  length = 449
FEATURE                 Location/Qualifiers
REGION                  1..449
                        note = Synthetic Construct
source                  1..449
                        mol_type = protein
                        organism = synthetic construct
SEQUENCE: 10
EVQLLESGGG LVQPGGSLRL SCAASGFTFS SYAMNWVRQA PGKGLEWVSA ISGGGRSTYY    60
ADSVKGRFTI SRDNSKNTLY LQMNSLRAED TAVYYCARDL SPSDVGWGYG FDIWGQGTLV   120
TVSSASTKGP SVFPLAPCSR STSESTAALG CLVKDYFPEP VTVSWNSGAL TSGVHTFPAV   180
LQSSGLYSLS SVVTVPSSNF GTQTYTCNVD HKPSNTKVDK TVERKCEVEC PECPAPPVAG   240
PSVFLFPPKP KDTLMISRTP EVTCVVVAVS HEDPEVQFNW YVDGVEVHNA KTKPREEQFN   300
STFRVVSVLT VVHQDWLNGK EYKCKVSNKG LPSSIEKTIS KTKGQPREPQ VYTLPPSREE   360
MTKNQVSLTC EVKGFYPSDI AVEWESNGQP ENNYKTTPPM LDSDGSFFLY SKLTVDKSRW   420
QQGNVFSCSV MHEALHNHYT QKSLSLSPG                                    449

SEQ ID NO: 11           moltype = AA  length = 107
FEATURE                 Location/Qualifiers
REGION                  1..107
                        note = Synthetic Construct
source                  1..107
                        mol_type = protein
                        organism = synthetic construct
SEQUENCE: 11
EIVLTQSPAT LSLSPGERAT LSCRASQSVS SNLAWYQQKP GQAPRLLIYD TFTRATGIPA    60
RFSGSGSGTD FTLTISSLEP EDFAVYYCQQ YGSSPPTFGQ GTRLEIK                 107

SEQ ID NO: 12           moltype = AA  length = 214
FEATURE                 Location/Qualifiers
REGION                  1..214
                        note = Synthetic Construct
source                  1..214
                        mol_type = protein
                        organism = synthetic construct
SEQUENCE: 12
EIVLTQSPAT LSLSPGERAT LSCRASQSVS SNLAWYQQKP GQAPRLLIYD TFTRATGIPA    60
RFSGSGSGTD FTLTISSLEP EDFAVYYCQQ YGSSPPTFGQ GTRLEIKRTV AAPSVFIFPP   120
SDEQLKSGTA SVVCLLNNFY PREAKVQWKV DNALQSGNSQ ESVTEQDKD STYSLSSTLT    180
LSKADYEKHK VYACEVTHQG LSSPVTKSFN RGEC                               214
```

ANTIBODY PURIFICATION

RELATED APPLICATIONS

This application is a continuation application of U.S. patent application Ser. No. 16/975,994, filed Aug. 26, 2020, which is a national stage application of PCT Application No. PCT/IB2019/051498, filed Feb. 25, 2019, which claims the priority of U.S. Provisional Application No. 62/635,943, filed Feb. 27, 2018, the disclosures of which are herein incorporated by reference in their entireties.

REFERENCE TO SEQUENCE LISTING

This application is being filed electronically via Patent Center and includes an electronically submitted sequence listing in .xml format. The .xml format contains a sequence listing entitled PC072423B_SeqListing_ST26.xml" created on Dec. 20, 2023, and having a size of 19 KB. The sequence listing contained in this .xml file is part of the specification and is herein incorporated by reference in its entirety.

FIELD

The present invention relates to methods for purifying antibodies from impurities, such as antibody degradation products. Purification methods disclosed herein involve the use of hydroxyapatite resins.

BACKGROUND

Antibodies are important biologic molecules for medical, diagnostic, industrial, and other uses. While many methods and reagents are available for the recombinant production of antibodies, due to, for example, the size and molecular complexity of antibodies, it frequently remains difficult to efficiently produce and purify a recombinant antibody of interest, particularly at large/industrial scale production levels.

For example, during the production of a recombinant antibody of interest, at times, a degradation product related to the antibody of interest may arise; the degradation product is an unwanted impurity. This degradation product may have some molecular properties that are very similar to the antibody of interest (e.g. identical or almost identical amino acid sequences or mass). Because of the molecular similarities between the intact antibody of interest and the degraded version of the antibody, it may be very difficult to effectively separate the intact antibody from the degraded antibody.

Accordingly, there is a need for new and improved methods for the purification of antibodies from impurities.

SUMMARY

Provided herein are methods for purifying an antibody of interest from one or more impurities.

In some embodiments, provided herein is a method of purifying an antibody comprising: A) loading an antibody preparation in a load buffer onto a hydroxyapatite (HA) resin, wherein: the antibody preparation comprises: I) an intact antibody of interest and II) a clipped version of the antibody of interest, wherein the clipped version of the antibody of interest is a degradation production from the intact antibody of interest, and has a mass that is less than 10% different than the mass of the intact antibody of interest; and B) eluting the intact antibody of interest from the HA resin with an elution buffer.

In some embodiments, provided herein is a method of purifying a bispecific antibody comprising: A) loading an antibody preparation in a load buffer onto a hydroxyapatite (HA) resin, wherein: the antibody preparation comprises: I) an intact bispecific antibody of interest; and II) at least one impurity species, wherein the impurity species are selected from the group consisting of: a) a clipped version of the bispecific antibody of interest, wherein the clipped version of the bispecific antibody of interest is a degradation production from the intact bispecific antibody of interest, and has a mass that is less than 10% different than the mass of the intact bispecific antibody of interest; b) a first parent antibody, wherein the first parent antibody is a monospecific antibody having the same antigen specificity as a first arm of the intact bispecific antibody; c) a second parent antibody, wherein the second parent antibody is a monospecific antibody having the same antigen specificity as a second arm of the intact bispecific antibody; and d) high molecular mass species (HMMS); and B) eluting the intact bispecific antibody of interest from the HA resin with an elution buffer.

In some embodiments, provided herein is a method of purifying a bispecific antibody comprising: A) loading an antibody preparation in a load buffer onto a hydroxyapatite (HA) resin, wherein: I) the antibody preparation comprises: a) an intact bispecific antibody of interest and b) a clipped version of the bispecific antibody of interest, wherein the clipped version of the antibody of interest is a degradation production from the intact bispecific antibody of interest, and has a mass that is less than 10% different than the mass of the intact bispecific antibody of interest; and II) the ratio of molecules of the clipped bispecific antibody to molecules of the intact bispecific antibody in the antibody preparation is between at least 1:50 and no greater than 1:5; B) eluting the intact bispecific antibody from the HA resin with an elution buffer. In some embodiments, the method further comprises the step of C) collecting a purified fraction eluted from the HA resin, wherein the purified fraction comprises the intact bispecific antibody.

In some embodiments, provided herein is a method of purifying an antibody comprising: A) loading an antibody preparation in a load buffer onto a hydroxyapatite (HA) resin, wherein: I) the antibody preparation comprises: a) an intact antibody of interest and b) a clipped version of the antibody of interest, wherein the clipped version of the antibody of interest is a degradation production from the intact antibody of interest, and has a mass that is less than 10% different than the mass of the intact antibody of interest; and II) the clipped version of the antibody comprises at least 1%, 2%, 3%, 4%, 5%, 6%, 7%, 8%, 9%, 10%, 15%, or 20% of the antibody preparation by mass; B) eluting the intact antibody from the HA resin with an elution buffer, and C) collecting a purified fraction eluted from the HA resin, wherein the purified fraction comprises the intact antibody, and contains less than 1%, 2%, 3%, 4%, 5%, 6%, 7%, 8%, 9%, 10%, 15%, or 20% by mass clipped antibody, wherein the purified fraction contains a lower % by mass clipped antibody than the antibody preparation.

In some embodiments, in a method provided herein involving eluting an antibody of interest from an HA resin with an elution buffer, the elution buffer comprises an ion. Optionally, the concentration of the ion in the buffer is increased during the elution. Optionally, the concentration of the ion in the buffer around the HA resin is increased during the elution.

In some embodiments, in a method provided herein involving an antibody, the antibody is a heterodimeric bispecific antibody.

In some embodiments, in a method provided herein involving collecting a purified fraction eluted from the HA resin, wherein the purified fraction comprises the intact antibody of interest, the purified fraction comprises at least 80%, 90%, 95%, 96%, 97%, 98%, or 99% by mass intact antibody of interest.

In some embodiments, in a method provided herein involving a purified fraction comprising an intact bispecific antibody and a clipped bispecific antibody, the ratio of clipped bispecific antibody molecules to intact bispecific antibody molecules in the purified fraction is no greater than 1:400, 1:200, 1:100, or 1:50.

In some embodiments, in a method provided herein involving an antibody of interest that is an anti-CD3 antibody or that is a bispecific antibody that contains an anti-CD3 arm, the antibody comprises at least one of the following: i) a VH region comprising an amino acid sequence as shown in SEQ ID NO: 1; ii) a heavy chain comprising an amino acid sequence as shown in SEQ ID NO: 2; iii) a VH region comprising an amino acid sequence as shown in SEQ ID NO: 1 and a VL region comprising an amino acid sequence as shown in SEQ ID NO: 3; or iv) a heavy chain comprising an amino acid sequence as shown in SEQ ID NO: 2 and a light chain comprising an amino acid sequence as shown in SEQ ID NO: 4.

In some embodiments, in a method provided herein involving a bispecific antibody, the bispecific antibody is: i) an anti-BCMA/anti-CD3 bispecific antibody comprising an anti-BCMA arm and an anti-CD3 arm, or ii) an anti-FLT3/anti-CD3 bispecific antibody comprising an anti-FLT3 arm and an anti-CD3 arm.

In some embodiments, in a method provided herein involving a bispecific antibody comprising an anti-BCMA arm, the anti-BCMA arm comprises at least one of the following: i) a VH region comprising an amino acid sequence as shown in SEQ ID NO: 5; ii) a heavy chain comprising an amino acid sequence as shown in SEQ ID NO: 6; iii) a VH region comprising an amino acid sequence as shown in SEQ ID NO: 5 and a VL region comprising an amino acid sequence as shown in SEQ ID NO: 7; or iv) a heavy chain comprising an amino acid sequence as shown in SEQ ID NO: 6 and a light chain comprising an amino acid sequence as shown in SEQ ID NO: 8.

In some embodiments, in a method provided herein involving a bispecific antibody comprising an anti-FLT3 arm, the anti-FLT3 arm comprises at least one of the following: i) a VH region comprising an amino acid sequence as shown in SEQ ID NO: 9; ii) a heavy chain comprising an amino acid sequence as shown in SEQ ID NO: 10; iii) a VH region comprising an amino acid sequence as shown in SEQ ID NO: 9 and a VL region comprising an amino acid sequence as shown in SEQ ID NO: 11; or iv) a heavy chain comprising an amino acid sequence as shown in SEQ ID NO: 10 and a light chain comprising an amino acid sequence as shown in SEQ ID NO: 12.

In some embodiments, in a method provided herein involving loading an antibody preparation onto an HA resin, the antibody preparation is loaded onto the HA resin to a density on the resin of between 2, 3, 4, or 5 g/L and 8, 9, 10, 12, 15, or 20 g/L.

In some embodiments, in a method provided herein involving loading an antibody preparation onto an HA resin, at least 1, 5, 10, 50, 100, 500, 1000, or 5000 grams of antibody preparation is loaded onto the HA resin.

In some embodiments, in a method provided herein involving an antibody preparation, the antibody preparation comprises at least 50%, 60%, 70%, or 80% but less than 90% 95%, 97%, 98%, or 99% by mass intact antibody of interest.

In some embodiments, in a method provided herein involving a clipped antibody, the clipped antibody has a mass that is less than 0.1%, 0.5%, 1%, or 2% different than the mass of the intact antibody. In some embodiments, in a method provided herein involving a clipped antibody, the clipped antibody has a mass that is between about 5 and 100 Daltons greater than the mass of the intact antibody. In some embodiments, in a method provided herein involving a clipped antibody, the clipped antibody has a mass that is about 18 Daltons greater than the mass of the intact antibody.

In some embodiments, in a method provided herein involving a clipped antibody, the clipped antibody has a cleaved peptide bond in a polypeptide chain of the antibody, and wherein the cleaved peptide bond is in a heavy chain of the antibody. In some embodiments, in a method provided herein involving a clipped antibody, the clipped antibody has a cleaved peptide bond in a polypeptide chain of the antibody, and wherein the cleaved peptide bond is in a light chain of the antibody.

In some embodiments, in a method provided herein involving a clipped antibody, the clipped antibody contains the same number of amino acids and the same amino acid sequences as the intact antibody. Alternatively, in some embodiments, the clipped antibody contains a different number of amino acids as the intact antibody.

In some embodiments, in a method provided herein involving an antibody of interest that comprises a VH and VL domain which specifically bind to CD3, a corresponding clipped antibody comprises a cleaved peptide bond in the VH domain that specifically binds CD3.

In some embodiments, in a method provided herein involving an HA resin, the HA resin is ceramic hydroxyapatite (cHA) resin.

In some embodiments, in a method provided herein, an HA resin is washed with a wash buffer comprising phosphate ions after loading the antibody preparation onto the HA resin but prior to eluting the intact bispecific antibody from the resin. Optionally, the wash buffer comprises phosphate ions at concentration between about 5, 10, 15, 20, and 30, 40, or 50 mM.

In some embodiments, in a method provided herein involving an elution buffer containing an ion, the ion is phosphate. In some embodiments, the concentration of phosphate ion during elution may increase from about 30, 40, or 50 mM to about 60, 70, 80, 100, 150, or 200 mM.

In some embodiments, in a method provided herein the pH of at least one of the load buffer, wash buffer, and elution buffer is at or between about pH 7.0 and 8.0.

In some embodiments, in a method provided herein involving an antibody preparation, the antibody preparation contains proteins that were previously loaded onto and eluted from at least one of: i) a protein A resin and ii) an ion exchange resin. Optionally, the antibody preparation contains proteins that were previously loaded onto and eluted from both of: i) a protein A resin and ii) an ion exchange resin.

In some embodiments, the antibody prepared using the method as described herein is isolated and/or purified for use as or in the preparation of pharmaceuticals.

In some embodiments, provided is an antibody purified using the methods as described herein.

BRIEF DESCRIPTION OF THE FIGURES/DRAWINGS

Figure 5:
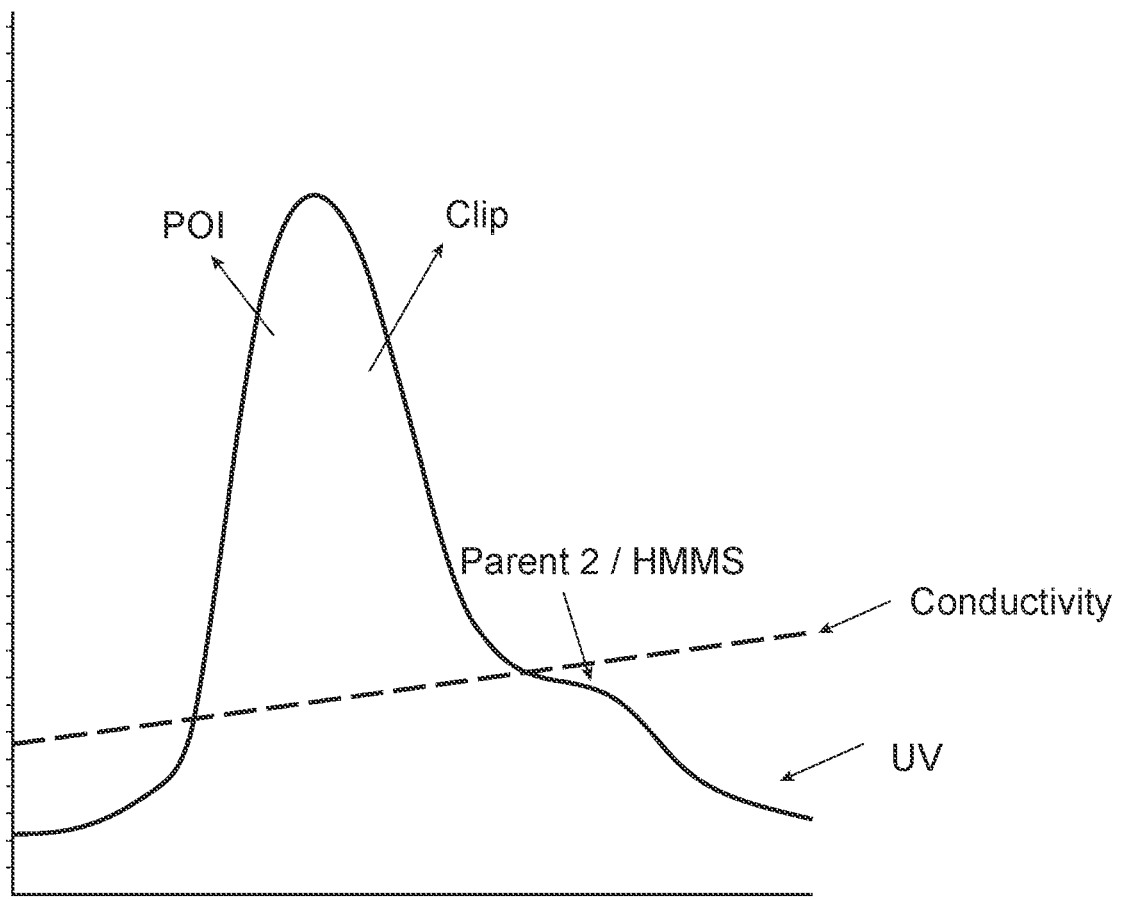
FIG. 5 depicts a chromatogram showing the separation of an anti-BCMA/anti-CD3 bispecific antibody of interest ("POI") from multiple different impurities via elution from an HA resin.
Figure 6:
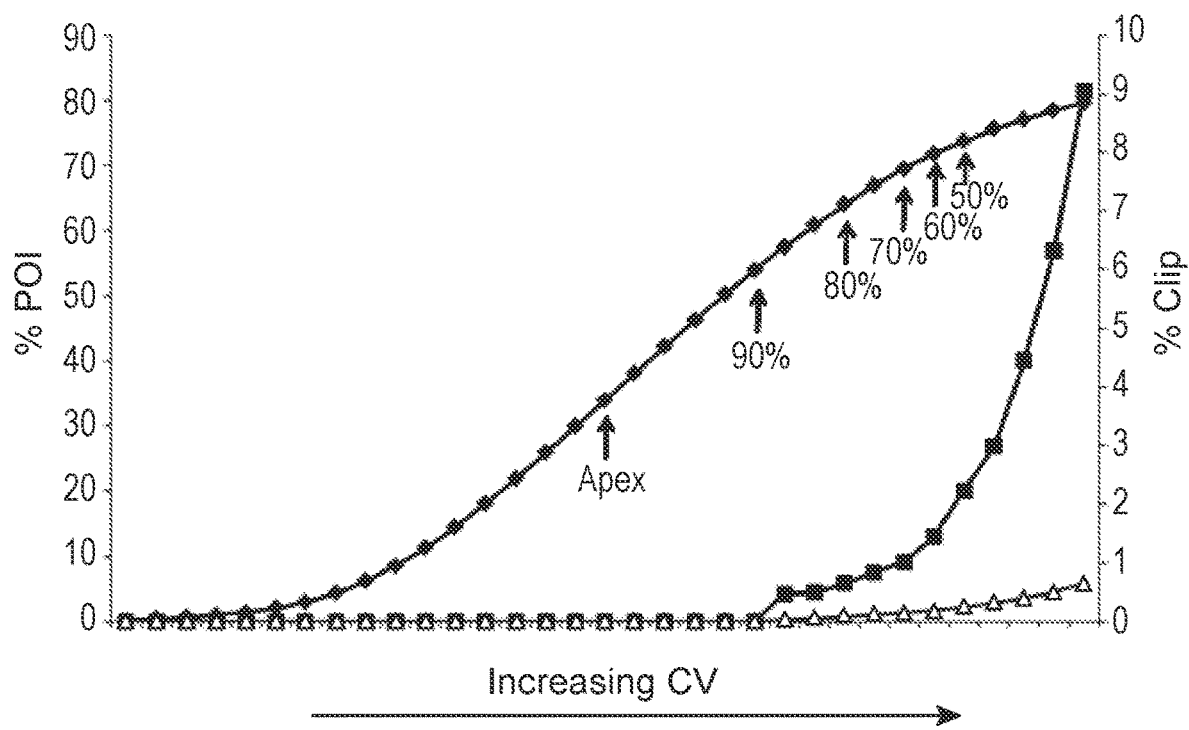
Figure 7:
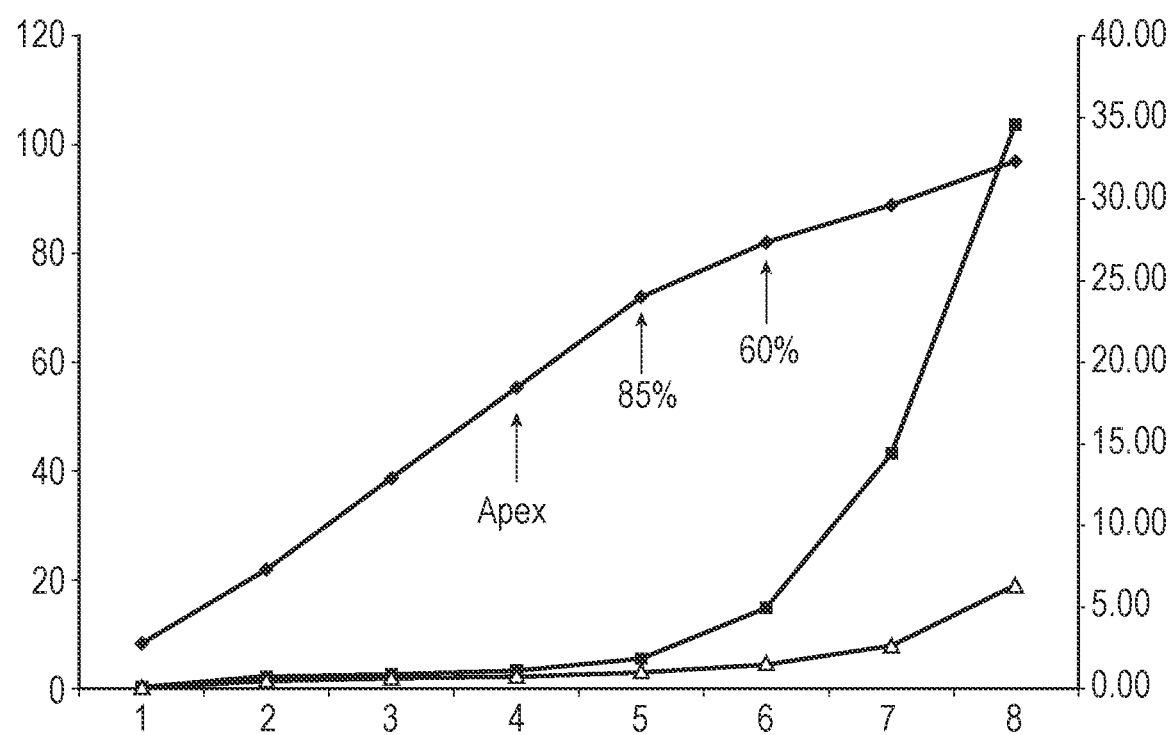

FIG. 6 depicts a graph showing the relative amounts of different protein species (including the antibody of interest and various impurities) in different fractions eluted from an HA resin according to an HA chromatography run as depicted in the chromatogram of FIG. 5, in which an anti-BCMA/anti-CD3 bispecific antibody of interest is separated from multiple different impurities via elution from an HA resin FIG. 7 depicts a graph showing the relative amounts of different protein species (including the antibody of interest and various impurities) in different fractions eluted from an HA resin according to an HA chromatography run, in which an anti-FLT3/anti-CD3 bispecific antibody of interest is separated from multiple different impurities via elution from an HA resin.

DETAILED DESCRIPTION

Provided herein are methods for purifying an antibody of interest from one or more impurities. Methods provided herein involve the use of a hydroxyapatite resin to separate the antibody of interest from impurities. In some embodiments, the antibody of interest is a bispecific antibody. In some embodiments, an impurity is an antibody that is related to the antibody of interest (i.e. it has a similar or the same amino acid sequence(s) as the antibody of interest), but it is modified in one or more ways as compared to the antibody of interest, and it has a different mass than the antibody of interest. Optionally, the mass of an antibody impurity species is very similar to the mass of the antibody of interest. For example, in some embodiments, the mass of an antibody impurity species is less than 5%, 2%, 1%, 0.5%, 0.2%, 0.1%, 0.05%, 0.02%, or 0.01% different from the mass of the antibody of interest. Optionally, methods provided herein may be used for the large scale purification of an antibody of interest from one or more impurities.

Definitions

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art.

The following terms, unless otherwise indicated, shall be understood to have the following meanings:

An "antibody" is an immunoglobulin molecule capable of specific binding to a target, such as a carbohydrate, polynucleotide, lipid, polypeptide, etc., through at least one antigen recognition site, located in the variable region of the immunoglobulin molecule. As used herein, the term encompasses not only intact polyclonal or monoclonal antibodies, but also fragments thereof (such as Fab, Fab', F(ab')$_2$, Fv), single chain (ScFv) and domain antibodies (including, for example, shark and camelid antibodies), diabodies, and fusion proteins comprising an antibody, and any other modified configuration of the immunoglobulin molecule that comprises an antigen recognition site. The term "antibody" includes monospecific, bispecific, and multispecific antibodies. An antibody includes an antibody of any class, such as IgG, IgA, or IgM (or subclass thereof), and the antibody need not be of any particular class. Depending on the antibody amino acid sequence of the constant region of its heavy chains, immunoglobulins can be assigned to different classes. There are five major classes of immunoglobulins: IgA, IgD, IgE, IgG, and IgM, and several of these may be further divided into subclasses (isotypes), e.g., IgG1, IgG2, IgG3, IgG4, IgA1 and IgA2. The heavy-chain constant regions that correspond to the different classes of immunoglobulins are called alpha, delta, epsilon, gamma, and mu, respectively. The subunit structures and three-dimensional configurations of different classes of immunoglobulins are well known.

As used herein, the terms "heavy chain", "light chain", "variable region" or "variable domain", "framework region", "constant domain", and the like, have their ordinary meaning in the immunology art and refer to domains in naturally occurring immunoglobulins and the corresponding domains of recombinant binding proteins (e.g. humanized antibodies, bispecific antibodies, single chain antibodies, chimeric antibodies, etc.). The basic structural unit of naturally occurring immunoglobulins is a tetramer having two light chains and two heavy chains, usually expressed as a glycoprotein of about 150,000 Da. The amino-terminal (N-terminal) portion of each chain includes a variable region of about 100 to 110 or more amino acids primarily responsible for antigen recognition. The carboxy-terminal (C-terminal) portion of each chain defines a constant region. Each light chain is comprised a light chain variable domain (VL) and a light chain constant domain (CL). Each heavy chain is comprised of a heavy chain variable region (VH) and a heavy chain constant region, having CH1, hinge, CH2 and CH3 domains. The variable regions of an IgG molecule comprise regions of hypervariability, termed the complementarity determining regions (CDRs), which contain the residues in contact with antigen, and non-CDR segments, termed framework regains (FR), which generally maintain the structure and determine the positioning of the CDR loops (although certain framework residues may also contact antigen). Each VH and VL comprises three CDRs and four FRs, arranged from amino-terminus to carboxy-terminus in the following structure: n-FR1, CDR1, FR2, CDR2, FR3, CDR3, FR4-c. Immunoglobulin molecules can be of any type (e.g., IgG, IgE, IgM, IgD, IgA and IgY) and class (e.g., IgG1, IgG2, IgG 3, IgG4, IgA1 and IgA2) or subclass.

A "bispecific" or "dual-specific" is a hybrid antibody having two different antigen binding sites. The two antigen binding sites of a bispecific antibody bind to two different epitopes, which may reside on the same or different protein targets.

An "intact" antibody refers to a recombinant antibody that contains all of the expected peptide bonds and amino acids of the recombinant antibody (i.e. that would be expected based on the nucleic acid sequence(s) encoding the polypeptide(s) of the antibody). In contrast, a "clipped" antibody refers to a version of the corresponding "intact" antibody that is missing at least one peptide bond, as compared to the corresponding "intact" antibody. References herein to an "antibody of interest" generally refer to an intact antibody of interest, unless the context clearly dictates otherwise.

Reference to "about" a value or parameter herein includes embodiments that are directed to that value or parameter per se, as well as to values or parameters that may be as much as 10% below or above the stated numerical value for that parameter. For example, a reference to "about 5 mg" includes 5 mg and also any value between 4.5 mg and 5.5 mg.

Methods

Methods provided herein may be used to purify an antibody of interest away from one or more impurities. In methods provided herein, an antibody preparation (also referred to herein as a "starting sample") containing the antibody of interest and one or more impurity molecules is loaded onto a hydroxyapatite (HA) resin, which binds to the antibody of interest and optionally one or more impurity molecules. The HA resin is then washed to remove any loosely bound impurities. (In some embodiments, all impurity molecules may flow through and not bind to the HA resin.) Next, the antibody of interest is eluted from the HA resin using a phosphate elution buffer, which is typically introduced onto the resin via a gradient of increasing phosphate ion concentration. Elution of the antibody of interest from the HA resin yields a purified sample containing the antibody of interest, and fewer (or no) impurities than were present with the antibody of interest in the starting sample. During the elution of the antibody of interest from the HA resin, any impurity molecules bound to the HA resin may also elute at some point during the gradient of increasing phosphate ion concentration. However, the impurity molecules elute from the HA resin under sufficiently different conditions from the conditions of elution of the antibody of interest, such that the antibody of interest may be effectively separated from the impurity molecules during the elution process. Additional details about the above method steps and related materials and steps are provided below.

Hydroxyapatite Resin

Various hydroxyapatite resins are available commercially, and any available form of the material can be used with methods provided herein. Optionally, a hydroxyapatite is in a crystalline form. Optionally, a hydroxyapatite is agglomerated to form particles and sintered at high temperatures into a stable porous ceramic mass.

In some embodiments, an HA resin provided herein is a ceramic hydroxyapatite (cHA) resin. "ceramic hydroxyapatite"/"cHA" refers to an insoluble hydroxylated calcium phosphate of the formula $Ca_{10}(PO_4)_6(OH)_2$, which has been sintered at high temperatures into a spherical, macroporous ceramic form. As used herein "ceramic hydroxyapatite"/ "cHA" encompasses, but is not limited to, Type I and Type II ceramic hydroxyapatite, and also encompasses any suitable particle size, unless otherwise specified. Typical cHA particle sizes that may be used with methods provided herein, include, for example, a particle size between 1-100 µm or 1-1000 µm in diameter, such as 20 µm, 40 µm or 80 µm. Exemplary cHA resins that may be used with methods provided herein include CHT™ Type I and Type II resins (Bio-Rad). Any reference herein to an "HA resin" or the like encompasses cHA resin.

Typically, in a method provided herein, the HA resin is provided in one or more chromatography columns. The column properties, such as the column's diameter, length, and packing density can be selected based on various factors, including the needs of a particular purification project (i.e. the amount of protein to be purified), and factors relating to the HA resin to be used in the column, such as the its pore size, particle size, compressibility, load capacity, and dynamic binding capacity. In addition, methods provided herein are frequently described in relation to HA resin in a chromatography column; however, other suitable related configurations for the resin are not excluded. Also, reference herein to a "HA column", or the like refers to a chromatography column that is packed with a HA resin.

Equilibrating a HA Column Prior to Protein Loading

In some embodiments, prior to loading a sample containing an antibody of interest onto an HA column, methods provided herein may comprise a step of pre-equilibrating the column with one or more equilibration buffer(s). The equilibration buffers may be introduced onto the column, for example, to ensure that the HA resin is clean at the start of the method (i.e. to ensure that the resin does not have impurities already bound to the resin) and/or to ensure that the solution surrounding the HA resin is compatible with the sample to be loaded onto the resin.

In some embodiments, an equilibration buffer is a phosphate buffer comprising, for example, sodium phosphate, wherein the concentration of the phosphate ions in the buffer is from about 100 to 500 mM. Such equilibration buffers may also be referred to herein as "high phosphate equilibration buffers" or the like. For example, in an embodiment, a high phosphate equilibration buffer may contain about 250 to 450 mM phosphate ions; in other embodiments, it may contain about 200, 250, 300, 350, 400, or 450 mM phosphate ions. This equilibration buffer contains a relatively high concentration of phosphate ions in the buffer to elute any contaminants/impurities that are already present on the HA resin (i.e. that are there before the sample containing the protein of interest is loaded onto the resin; such impurities might be present, for example, if the HA resin had been used previously for a purification method, and the resin was not fully cleaned after the previous use). A high phosphate equilibration buffer may have a pH of about 6.0 to 9.0. For example, in an embodiment, a high phosphate equilibration buffer may have a pH of about 7.0 to 8.0; in other embodiments, it may have a pH of about 7.0, 7.5, or 8.0. In one embodiment, a high phosphate equilibration buffer contains about 400 mM phosphate ions, and has a pH of about 7.5. In some embodiments, a high phosphate equilibration buffer may also be referred to herein as "Equilibration Buffer 1".

In some embodiments, an equilibration buffer is a phosphate buffer comprising, for example, sodium phosphate, wherein the concentration of the phosphate ions in the buffer is from about 1 to 20 mM. Such equilibration buffers may also be referred to herein as "low phosphate equilibration buffers" or the like. For example, in an embodiment, a low phosphate equilibration buffer may contain about 1 to 10 mM phosphate ions; in other embodiments, it may contain about 1, 2, 3, 4, 5, or 10 mM phosphate ions. This equilibration buffer contains a relatively low concentration of phosphate ions in the buffer in order to generate conditions around the HA resin conducive for the protein of interest to bind to the resin. Optionally, a low phosphate equilibration buffer may additionally contain HEPES in a concentration from about 1 to 50 mM. For example, in an embodiment, a low phosphate equilibration buffer may contain about 2 to 30 mM HEPES; in other embodiments, it may contain about 5, 10, 15, 20, or 25 mM HEPES. A low phosphate equilibration buffer may have a pH of about 6.0 to 9.0. For example, in an embodiment, a low phosphate equilibration buffer may have a pH of about 7.0 to 8.0; in other embodiments, it may have a pH of about 7.0, 7.5, or 8.0. In one embodiment, a low phosphate equilibration buffer contains about 2 mM phosphate ions, 20 mM HEPES, and has a pH of about 7.5. In some embodiments, a low phosphate equilibration buffer may also be referred to herein as "Equilibration Buffer 2". Importantly, however, with methods provided herein, a low phosphate equilibration buffer may be used to pre-equilibrate the resin without the prior use of a high phosphate equilibration buffer during the method.

Loading a HA Column with the Sample Containing the Antibody of Interest

Once a HA column is ready for protein loading, the sample containing the antibody of interest and impurities is loaded onto the HA column. The buffer in which the sample loaded onto the HA column may be referred to herein as the "load buffer". In some embodiments, when a sample containing an antibody of interest is initially obtained for use with a method as provided herein, the sample is already in a suitable load buffer for loading the sample onto the HA column. In other embodiments, however, prior to loading a sample onto the HA column, the sample may be treated (e.g. diluted, concentrated, or buffer exchanged) in order to modify the buffer conditions of the sample, such that the sample will be in a suitable buffer for loading onto the column. For example, with methods provided herein, a load buffer cannot have a high concentration of phosphate ions that would impede the binding of the antibody of interest to the HA resin. Accordingly, if an initial sample containing the antibody of interest contains a high concentration of phosphate ions, that sample would need to be, for example diluted or buffer exchanged, until the concentration of phosphate ions in the sample is reduced to a suitably low concentration that permits the binding of the antibody of interest to the HA resin.

In some embodiments, a load buffer contains no more than about 10 mM phosphate ions. For example, in some embodiments, a load buffer contains less than about 10 mM, 5 mM, 4 mM, 3 mM, 2 mM, or 1 mM phosphate ions. In some embodiments a load buffer contains 0 mM phosphate ions. Optionally, a load buffer may contain various other salts or buffer components (e.g. Tris, glycine). A load buffer may have a pH of about 6.0 to 9.0. For example, in an embodiment, a load buffer may have a pH of about 7.0 to 8.0; in other embodiments, it may have a pH of about 7.0, 7.5, or 8.0.

In some embodiments, a sample containing the antibody of interest may be loaded onto an HA resin to a density on the resin of at least 1 g/L, 2 g/L, 3 g/L, 4 g/L, 5 g/L, 6 g/L, 7 g/L, 8 g/L, 9 g/L, 10 g/L, 12 g/L, 15 g/L, 20 g/L, 25 g/L, or 30 g/L. In some embodiments, a sample containing the antibody of interest may be loaded onto an HA resin to a density on the resin of between at least 1 g/L, 2 g/L, 3 g/L, 4 g/L, 5 g/L, 6 g/L, 7 g/L, 8 g/L, 9 g/L, 10 g/L, 12 g/L, 15 g/L, 20 g/L, or 25 g/L and no more than 2 g/L, 3 g/L, 4 g/L, 5 g/L, 6 g/L, 7 g/L, 8 g/L, 9 g/L, 10 g/L, 12 g/L, 15 g/L, 20 g/L, 25 g/L, or 30 g/L, wherein the second value is larger than the first value.

Washing the HA Column

After loading the sample containing the antibody of interest and impurities on to the HA column, but prior to elution of the antibody of interest, methods provided herein may optionally comprise an additional step of washing the loaded column with one or more wash buffer(s) to, for example, remove non-specifically immobilized impurities or otherwise prepare or equilibrate the column for the elution step. The properties of any wash buffer can be determined by one of ordinary skill in the art. In one embodiment the wash buffer is a phosphate buffer comprising, for example, sodium phosphate, and the concentration of the phosphate ions in the buffer is from about 5 to 50 mM. For example, in an embodiment, a wash buffer may contain about 10 to 40 mM phosphate ions; in other embodiments, it may contain about 10, 20, 30, 40, or 50 mM phosphate ions. Optionally, a wash buffer may additionally contain HEPES in a concentration from about 1 to 50 mM. For example, in an embodiment, a wash buffer may contain about 2 to 30 mM HEPES; in other embodiments, it may contain about 5, 10, 15, 20, or 25 mM HEPES. A wash buffer may have a pH of about 6.0 to 9.0. For example, in an embodiment, a wash buffer may have a pH of about 7.0 to 8.0; in other embodiments, it may have a pH of about 7.0, 7.5, or 8.0. In one embodiment, a wash buffer contains about 40 mM phosphate ions, 20 mM HEPES, and has a pH of about 7.5.

Eluting the Antibody of Interest From the HA Column

The methods provided herein comprise the step of eluting the bound antibody of interest from the HA resin. The bound antibody of interest is eluted by one or more elution buffers. Typically, the elution buffer contains one or more salts or ions, and the concentration of the salts or ions is increased during the elution.

In some embodiments, an elution buffer provided herein comprises phosphate ions. Optionally, the concentration of phosphate ions in the elution buffer is increased from an initial concentration of about 20 mM to about 200 mM during the elution. For example, in an embodiment, the concentration of phosphate ions in the elution buffer is increased from an initial concentration of about 40 mM to about 80 mM or about 40 mM to about 100 mM during the elution. The specific manner and rate of increasing the concentration of phosphate ions in the elution buffer may be determined as is suitable for the antibody of interest, and that takes into account the types of impurity molecules that are also bound to the HA resin. For example, the concentration of phosphate ions in the elution buffer may be raised in a gradual/shallow linear gradient. Use of a shallow gradient may permit the effective separation of one or more molecules that elute from the HA resin under similar, but different conditions. Alternatively, in some embodiments, the concentration of phosphate ions in the elution buffer may be raised in a steep gradient, or it may be raised stepwise.

Optionally, an elution buffer may additionally contain HEPES in a concentration from about 1 to 50 mM. For example, in an embodiment, an elution buffer may contain about 2 to 30 mM HEPES; in other embodiments, it may contain about 5, 10, 15, 20, or 25 mM HEPES. An elution buffer may have a pH of about 6.0 to 9.0. For example, in an embodiment, an elution buffer may have a pH of about 7.0 to 8.0; in other embodiments, it may have a pH of about 7.0, 7.5, or 8.0. In one embodiment, an elution buffer contains about 40-80 mM phosphate ions (increasing over a gradient), 20 mM HEPES, and has a pH of about 7.5.

The elution conditions, including, but not limited to the properties of the elution buffer suitable for use with a HA resin (such as the buffer composition, pH, concentration, ionic strength, and the like); any necessary step or gradient change in the properties of the elution buffer; number of column volumes of elution buffer to be used; flow rate and the like can be determined to optimize the elution of the antibody of interest from the HA column, as well as the separation of the antibody of interest from impurity molecules.

Following elution, the one or more peak fractions containing the antibody of interest are optionally collected individually or separately and optionally pooled, the pH optionally adjusted, optionally filtered and then optionally stored prior to additional processing as desired. The peak fractions for collection can be identified by any suitable means, such as identification using ultraviolet at A280 and starting collection when the ultraviolet signal rises above a desired amount and/or at a desired point in the elution conditions.

Material eluted from the HA resin and containing the antibody of interest may be optionally be referred to herein as a "purified fraction" or the like. The purified fraction may contain material from a single fraction eluted from the HA resin, or it may be the combination of multiple fractions eluted from the HA resin that have been pooled together. Typically, the purified fraction is prepared such that it is balanced between collecting a high amount of the antibody of interest, but a low amount of impurity molecules. These competing goals must often be balanced, for example, because there may be an at least partial overlap between the conditions when the antibody of interest elutes from the HA resin, and when a species of impurity molecule elutes from the HA resin.

Any of the buffers for methods provided herein (e.g. an equilibration buffer, load buffer, wash buffer, or elution buffer) may also comprise additional or alternative suitable components such as acetate, succinate, MES, ACES, MOPSO, PIPES, BES, TAPSO, AMPSO, TRICINE, EPPS, Bicine, DIPSO, HEPPSO, imidazole, Tris, Bis-tris, TAPS, arginine, glycine, acetonitrile, ethanol, methanol, 1% sodium dodecyl sulfate (SDS) or other surfactants, and the like.

In some embodiments, any of the buffers provided herein may have a pH of about 6.0 to 9.0. In other embodiments, any of the buffers provided herein may have a pH of about 5.0 to 9.0, 5.5 to 9.0, 6.5 to 9.0, 7.0 to 9.0, 7.5 to 9.0, 7.0 to 8.0, or 6.5 to 8.5.

In buffers provided herein described as containing "phosphate ions", the phosphate ions may be generated in the buffer from any suitable phosphate salt, such as sodium phosphate or potassium phosphate. In addition, solutions provided herein that are described as being prepared with "sodium phosphate" may be prepared with any suitable sodium phosphate salt (e.g. monobasic or dibasic).

After the antibody of interest has been eluted from the HA column, the HA column is optionally cleaned to remove impurities and other components which degrade the column resin and prepare it for storage subsequent use. In one embodiment, the column is first regenerated using a buffer such as one containing sodium phosphate at a concentration of about 0.4 M and at a pH of about 7.5; followed by an optional sanitization step using a cleaning solution such as about 1 M NaOH and about 0.5 M potassium phosphate, and then prepared for storage using a storage solution such as about 0.1 M NaOH.

Antibodies

Methods provided herein may be used to purify an antibody of interest from one or more impurities. For example, the purified antibody can be used as or in the preparation of pharmaceuticals.

In some embodiments, an antibody purified according to a method provided herein is any type of antibody provided herein. For example, an antibody purified according to a method provided herein may be a full-length antibody or an antibody fragment (e.g. an scFv or Fab), and it may be monospecific or bispecific. Typically, an antibody of interest purified according to a method provided herein is a recombinant antibody.

IgG Antibodies

In some embodiments, an antibody that may be purified according to a method provided herein is an immunoglobulin G (IgG) antibody. As is known in the art, an IgG antibody contains two heavy chains and two light chains, and has a general "Y" shape. In standard IgG molecules, the two heavy chains have the same amino acid sequence, and the two light chains have the same amino acid sequence. An IgG antibody may be described as having two "arms" (i.e. a "first arm" and a "second arm"), in which each arm contains one heavy chain and one light chain, linked together by a disulfide bond. In standard IgG molecules, the first arm of the antibody is identical to the second arm of the antibody (due to each arm containing a heavy chain and light chain that have the same amino acid sequence as the heavy chain and light chain in the other arm, respectively). The N-terminal region of the heavy chain contains the heavy chain variable region (VH), and the N-terminal region of the light chain contains the light chain variable region (VL). The VH and VL regions contain the portion of the antibody that specifically binds to an antigen. Thus, each arm of an IgG antibody can specifically bind to an antigen. In standard IgG molecules, both the first arm and the second arm of the IgG antibody bind to the same antigen (due to the fact that both arms contain heavy chains and light chains having the same respective amino acid sequence). A standard IgG antibody may be referred to as being "homodimeric", based on having 2 arms that are the same. An IgG antibody purified according to a method provided herein may be of the subclass IgG1, IgG2, IgG3, or IgG4.

Bispecific IgG Antibodies

In some embodiments, an antibody that may be purified according to a method provided herein is a bispecific IgG antibody. In a bispecific IgG antibody, each of the two arms of the antibody specifically binds to a different antigen. In addition, the amino acid sequence of the heavy chain in the first arm of the bispecific IgG antibody is different from the amino acid sequence of the heavy chain in the second arm of the same bispecific IgG antibody, and similarly, the amino acid sequence of the light chain in the first arm of the bispecific IgG antibody is typically different from the amino acid sequence of the light chain in the second arm of the same bispecific IgG antibody. A bispecific IgG antibody may therefore be referred to as being "heterodimeric", based on having 2 arms that are different. The first arm of a bispecific IgG antibody may be described as being specific for a "first antigen", and the second arm of a bispecific IgG antibody may be described as being specific for a "second antigen". In some embodiments, the bispecific antibody has an IgG1, IgG2, IgG3, or IgG4 isotype. In some embodiments, the bispecific antibody comprises an immunologically inert Fc region.

Bispecific IgG Antibodies—Methods of Making

Methods for making bispecific antibodies are known in the art (see, e.g., Suresh et al., Methods in Enzymology 121:210, 1986). Traditionally, the recombinant production of bispecific antibodies was based on the coexpression of two immunoglobulin heavy chain-light chain pairs, with the two heavy chains having different specificities (Millstein and Cuello, Nature 305, 537-539, 1983).

More recently, methods have been developed in which the following general steps are taken to prepare bispecific heterodimeric antibodies:

1) A first homodimeric antibody (also referred to herein as a "first parent antibody") and a second homodimeric antibody (also referred to herein as a "second parent antibody") are individually expressed and purified. The first homodimeric antibody is specific for a first target antigen of the bispecific antibody being prepared, and the second homodimeric antibody is specific for a second target antigen of the bispecific antibody being prepared. Thus, for example, if the objective is to prepare a bispecific antibody having specificity for BCMA and CD3, a monoclonal anti-BCMA antibody (the "first parent antibody") and a monoclonal anti-CD3 antibody (the "second parent antibody") are separately expressed and purified.

Figure 1:
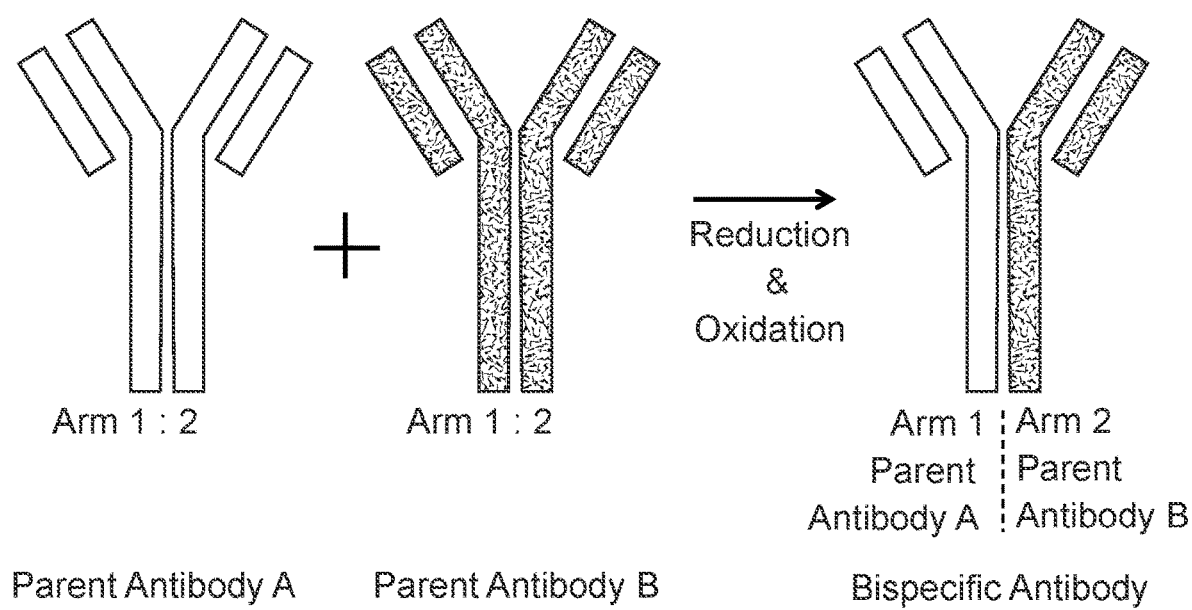
FIG. 1 depicts a schematic representation of a method of preparing a bispecific antibody that may be purified according to methods provided herein.

2) Next, the purified first homodimeric/parent antibody and the purified second homodimeric/parent antibody are mixed and incubated together under conditions that promote antibody arm exchange, such that heterodimeric bispecific antibodies are formed that contain a first arm from the first parent antibody and a second arm from the second parent antibody. These conditions typically involve a sequence of reducing conditions followed by oxidizing conditions. The reducing conditions promote cleavage of the disulfide bonds holding the two heavy chains of the homodimeric antibodies together, and thereby permit switching of antibody arms between the first parent antibody and second parent antibody. The subsequent oxidizing conditions then form new disulfide bridges which stabilize the newly-formed bispecific antibodies. This general approach for generating bispecific antibodies is outlined in FIG. 1. In FIG. 1, a first parent antibody ("Parent Antibody A"; grey color) and a second parent antibody ("Parent Antibody B"; black color) are depicted, each of which is a monospecific homodimer, and contains a first arm and a second arm. Typically, the first parent antibody and the second parent antibody are specific for different antigens. Then, the first parent antibody and second parent antibody are mixed together and exposed to reduction and oxidation steps that result in the formation of the bispecific antibody of interest, which contains a first arm from the Parent Antibody A, and a second arm from the Parent Antibody B, and the respective specificities of both arms.

Optionally, the amino acid sequence of an antibody heavy chain may be modified in one or more ways to promote the formation of bispecific antibodies. For example, the heavy chain of one arm of a bispecific antibody may contain an amino acid modification in the first hinge region, such that the substituted/replaced amino acid in the first hinge region has an opposite charge to the corresponding amino acid in the hinge region of the other arm of the formed bispecific antibody. This is described, for example, in International Patent Application No. PCT/US2011/036419 (WO2011/143545). In another approach, the formation of a desired heteromultimeric or heterodimeric protein (e.g., bispecific antibody) is enhanced by altering or engineering an interface between a first and a second immunoglobulin-like Fc region (e.g., a hinge region and/or a CH3 region). In this approach, the bispecific antibody may contain a CH3 region, wherein the CH3 region comprises a first CH3 polypeptide and a second CH3 polypeptide which interact together to form a CH3 interface, wherein one or more amino acids within the CH3 interface destabilize homodimer formation and are not electrostatically unfavorable to homodimer formation. This approach is also described in International Patent Application No. PCT/US2011/036419 (WO2011/143545).

The above method and other methods for preparing bispecific antibodies are further described, for example, in: International Patent Application No. PCT/162011/054899 (WP2012/059882), PCT/US2011/036419 (WP2011/143545), and Giese et al, Biotechnology Progress, "Bispecific Antibody Process Development: Assembly and Purification of Knob and Hole Bispecific Antibodies", 17 Jan. 2018, and references cited therein, each of which are incorporated by reference herein for all purposes. Methods provided herein for the purification of antibodies may be used to purify bispecific antibodies that were prepared by any suitable method.

Bispecific IgG Antibodies—Specificity

In some embodiments, an antibody that may be purified according to a method provided herein is a full-length human bispecific IgG antibody, wherein a first antibody variable domain of the first arm of the bispecific antibody is capable of binding to a first antigen, and a second antibody variable domain of the second arm of the bispecific antibody is capable of binding to a second antigen. The first antigen and second antigen may have any characteristics of an antigen as described herein. In some embodiments, the first antigen occurs on a first cell type, and the second antigen on a second cell type.

In some embodiments, an antibody that may be purified according to a method provided herein is a full-length human bispecific IgG antibody, wherein a first antibody variable domain of the antibody is capable of recruiting the activity of a human immune effector cell by specifically binding to an effector antigen located on the human immune effector cell, and wherein a second antibody variable domain of the antibody is capable of specifically binding to a target antigen.

A human immune effector cell that can be bound by an antibody provided herein can be any of a variety of immune effector cells known in the art. For example, the immune effector cell can be a member of the human lymphoid cell lineage, including, but not limited to, a T cell (e.g., a cytotoxic T cell), a B cell, and a natural killer (NK) cell. The immune effector cell can also be, for example, a member of the human myeloid lineage, including, but not limited to, a monocyte, a neutrophilic granulocyte, and a dendritic cell. Such immune effector cells may have either a cytotoxic or an apoptotic effect on a target cell or other desired effect upon activation by binding of an effector antigen. The effector antigen is an antigen (e.g., a protein or a polypeptide) that is expressed on the human immune effector cell. Examples of effector antigens that can be bound by an antibody provided herein include, but are not limited to, human CD3 (or CD3 (Cluster of Differentiation) complex), CD16, NKG2D, NKp46, CD2, CD28, CD25, CD64, and CD89.

The target antigen is expressed on a target cell in a diseased condition (e.g., an inflammatory disease, a proliferative disease (e.g., cancer), an immunological disorder, a neurological disease, a neurodegenerative disease, an autoimmune disease, an infectious disease (e.g., a viral infection or a parasitic infection), an allergic reaction, a graft-versus-host disease or a host-versus-graft disease). A target antigen is not effector antigen. Examples of the target antigens include, but are not limited to, BCMA, EpCAM (Epithelial Cell Adhesion Molecule), CCR5 (Chemokine Receptor type 5), CD19, HER (Human Epidermal Growth Factor Receptor)-2/neu, HER-3, HER-4, EGFR (Epidermal Growth Factor Receptor), FLT3 (Fms-Like Tyrosine kinase 3), PSMA, CEA, MUC-1 (Mucin), MUC2, MUC3, MUC4, MUC5AC, MUC5B, MUC7, CIhCG, Lewis-Y, CD20, CD33, CD30, ganglioside GD3, 9-O-Acetyl-GD3, GM2, Globo H, fucosyl GM1, Poly SA, GD2, Carboanhydrase IX (MN/CA IX), CD44v6, Shh (Sonic Hedgehog), Wue-1, Plasma Cell Antigen, (membrane-bound) IgE, MCSP (Melanoma Chondroitin Sulfate Proteoglycan), CCR8, TNF-alpha precursor, STEAP, mesothelin, A33 Antigen, PSCA (Prostate Stem Cell Antigen), Ly-6; desmoglein 4, E-cadherin neoepitope, Fetal Acetylcholine Receptor, CD25, CA19-9 marker, CA-125 marker and MIS (Muellerian Inhibitory Substance) Receptor type II, sTn (sialylated Tn antigen; TAG-72), FAP (fibroblast activation antigen), endosialin, EGFRvIII, LG, SAS and CD63.

In some embodiments, an antibody purified according to a method provided herein may be any antibody as described in U.S. application Ser. No. 15/085,644, filed Mar. 30, 2016 (Publication No. US20160297885), or U.S. application Ser. No. 15/993,874, filed May 31, 2018 (Publication No. US20180346601), which are hereby incorporated by reference in their entirety for all purposes.

In some embodiments, an antibody purified according to a method provided herein may be a bispecific IgG antibody, in which one arm of the antibody specifically binds to Cluster of Differentiation 3 (CD3). Information about CD3 is provided, for example, via UniProtKB ID # P07766.

In some embodiments, in a bispecific IgG antibody in which one arm of the antibody specifically binds to CD3, the VH region of the heavy chain of the CD3-binding arm has an amino acid sequence comprising the amino acid sequence:

```
                                        (SEQ ID NO: 1)
EVQLVESGGGLVQPGGSLRLSCAASGFTFSDYYMTWVRQAPGKG

LEWVAFIRNRARGYTSDHNPSVKGRFTISRDNAKNSLYLQMNSL

RAEDTAVYYCARDRPSYYVLDYWGQGTTVTVSS.
```

In some embodiments, in a bispecific IgG antibody in which one arm of the antibody specifically binds to CD3, the heavy chain of the CD3-binding arm has an amino acid sequence comprising the amino acid sequence:

```
                                        (SEQ ID NO: 2)
EVQLVESGGGLVQPGGSLRLSCAASGFTFSDYYMTWVRQAPGKG

LEWVAFIRNRARGYTSDHNPSVKGRFTISRDNAKNSLYLQMNSL

RAEDTAVYYCARDRPSYYVLDYWGQGTTVTVSSASTKGPSVFPLA

PCSRSTSESTAALGCLVKDYFPEPVTVSWNSGALTSGVHTFPAVL

QSSGLYSLSSVVTVPSSNFGTQTYTCNVDHKPSNTKVDKTVERKC

RVRCPRCPAPPVAGPSVFLFPPKPKDTLMISRTPEVTCVVVAVSH

EDPEVQFNVVYVDGVEVHNAKTKPREEQFNSTFRVVSVLTVVHQD

WLNGKEYKCKVSNKGLPSSIEKTISKTKGQPREPQVYTLPPSREE

MTKNQVSLTCLVKGFYPSDIAVEWESNGQPENNYKTTPPMLDSDG

SFFLYSRLTVDKSRWQQGNVFSCSVMHEALHNHYTQKSLSLSPGK.
```

In some embodiments, in a bispecific IgG antibody in which one arm of the antibody specifically binds to CD3, the VH region of the heavy chain of the CD3-binding arm has an amino acid sequence comprising a CDR1, a CDR2, and a CDR3 of the VH sequence shown in SEQ ID NO: 1.

In some embodiments, in a bispecific IgG antibody in which one arm of the antibody specifically binds to CD3, the VL region of the light chain of the CD3-binding arm has an amino acid sequence comprising the amino acid sequence:

```
                                        (SEQ ID NO: 3)
DIVMTQSPDSLAVSLGERATINCKSSQSLFNVRSRKNYLAWYQQK

PGQPPKLLISWASTRESGVPDRFSGSGSGTDFTLTISSLQAEDVAV

YYCKQSYDLFTFGSGTKLEIK.
```

In some embodiments, in a bispecific IgG antibody in which one arm of the antibody specifically binds to CD3, the light chain of the CD3-binding arm has an amino acid sequence comprising the amino acid sequence:

```
                                        (SEQ ID NO: 4)
DIVMTQSPDSLAVSLGERATINCKSSQSLFNVRSRKNYLAWYQ

QKPGQPPKLLISWASTRESGVPDRFSGSGSGTDFTLTISSLQAE

DVAVYYCKQSYDLFTFGSGTKLEIKRTVAAPSVFIFPPSDEQLK

SGTASVVCLLNNFYPREAKVQWKVDNALQSGNSQESVTEQDSKD

STYSLSSTLTLSKADYEKHKVYACEVTHQGLSSPVTKSFNRGEC.
```

In some embodiments, in a bispecific IgG antibody in which one arm of the antibody specifically binds to CD3, the VL region of the light chain of the CD3-binding arm has an amino acid sequence comprising a CDR1, a CDR2, and a CDR3 of the VL sequence shown in SEQ ID NO: 3.

In some embodiments, in a bispecific IgG antibody in which one arm of the antibody specifically binds to CD3, the VH region of the heavy chain of the CD3-binding arm has an amino acid sequence comprising the amino acid sequence shown in SEQ ID NO: 1, and the VL region of the light chain of the CD3-binding arm has an amino acid sequence comprising the amino acid sequence shown in SEQ ID NO: 3. In some embodiments, in a bispecific IgG antibody in which one arm of the antibody specifically binds to CD3, the heavy chain of the CD3-binding arm has an amino acid sequence comprising the amino acid sequence shown in SEQ ID NO: 2, and the light chain of the CD3-binding arm has an amino acid sequence comprising the amino acid sequence shown in SEQ ID NO: 4. In some embodiments, in a bispecific IgG antibody in which one arm of the antibody specifically binds to CD3, the VH region of the heavy chain of the CD3-binding arm has an amino acid sequence comprising a CDR1, a CDR2, and a CDR3 of the VH sequence shown in SEQ ID NO: 1, and the VL region of the light chain of the CD3-binding arm has an amino acid sequence comprising a CDR1, a CDR2, and a CDR3 of the VL sequence shown in SEQ ID NO: 3.

In some embodiments, an antibody purified according to a method provided herein may be a bispecific IgG antibody, in which one arm of the antibody specifically binds to B-cell maturation antigen (BCMA). Information about BCMA is provided, for example, via UniProtKB ID # Q02223.

In some embodiments, in a bispecific IgG antibody in which one arm of the antibody specifically binds to BCMA, the VH region of the heavy chain of the BCMA-binding arm has an amino acid sequence comprising the amino acid sequence: EVQLLESGGGLVQPGGSLRLS-CAASGFTFSSYPMSVVVRQAPGKGLEVVV-SAIGGSGG SLPYADIVKGRFTISRDNSKNT-LYLQMNSLRAEDTAVYYCARYWPMDIWGQGTLVTVSS (SEQ ID NO: 5). In some embodiments, in a bispecific IgG antibody in which one arm of the antibody specifically binds to BCMA, the heavy chain of the BCMA-binding arm has an amino acid sequence comprising the amino acid sequence: EVQLLESGGGLVQPGGSLRLS-CAASGFTFSSYPMSVVVRQAPGKGLEVVV-SAIGGSGG SLPYADIVKGRFTISRDNSKNT-LYLQMNSLRAEDTAVYYCARYWPMDIWGQGTLVTVSS SASTKGPSVFPLAPCSRSTSESTAALGCLVKDYF-PEPVTVSWNSGALTSGVHTFPAVL QSSGLYS-LSSVVTVPSSNFGTQTYTCNVDHKPSNTK VDKTVERKCEVECPECPAPPV AGPSVFLFPPKPKDTLMISRTPEVTCVVVAVSHEDPE-VQFNVVYVDGVEVHNAKTKPR EEQFN-STFRWSVLTVVHQDWLNGKEYKCKVSNKGLP SSIEKTISKTKGQPREPQVYT LPPSREEMTKNQVSLT-CEVKGFYPSDIAVEWESNGQPEN-NYKTTPPMLDSDGSFFLY SKLTVDKSRWQQGNVFSCSVMHEALHN-HYTQKSLSLSPGK (SEQ ID NO: 6). In some embodiments, in a bispecific IgG antibody in which one arm of the antibody specifically binds to BCMA, the VH region of the heavy chain of the BCMA-binding arm has an amino acid sequence comprising a CDR1, a CDR2, and a CDR3 of the VH sequence shown in SEQ ID NO: 5.

In some embodiments, in a bispecific IgG antibody in which one arm of the antibody specifically binds to BCMA, the VL region of the light chain of the BCMA-binding arm has an amino acid sequence comprising the amino acid sequence: EIVLTQSPGTLSLSPGERATLSCRASQSVSS-SYLAWYQQKPGQAPRLLMYDASIRATG IPDRFSGSGSGTDFTLTISRLEPED-FAVYYCQQYQSWPLTFGQGTKVEIK (SEQ ID NO: 7). In some embodiments, in a bispecific IgG antibody in which one arm of the antibody specifically binds to BCMA, the light chain of the BCMA-binding arm has an amino acid sequence comprising the amino acid sequence: EIVLTQSPGTLSLSPGERATLSCRASQSVSSSY-LAWYQQKPGQAPRLLMYDASIRATG IPDRFSGSGSGTDFTLTISRLEPED-FAVYYCQQYQSWPLTFGQGTKVEIKRTVAAPSV FIFPPSDEQLKSGTASWCLLNNFYPREAKVQWKVD-NALQSGNSQESVTEQDSKDST YSLSSTLTL-SKADYEKHKVYACEVTHQGLSSPVTKSFNRGEC (SEQ ID NO: 8). In some embodiments, in a bispecific IgG antibody in which one arm of the antibody specifically binds to BCMA, the VL region of the light chain of the BCMA-binding arm has an amino acid sequence comprising a CDR1, a CDR2, and a CDR3 of the VL sequence shown in SEQ ID NO: 7.

In some embodiments, in a bispecific IgG antibody in which one arm of the antibody specifically binds to BCMA, the VH region of the heavy chain of the BCMA-binding arm has an amino acid sequence comprising the amino acid sequence shown in SEQ ID NO: 5, and the VL region of the light chain of the BCMA-binding arm has an amino acid sequence comprising the amino acid sequence shown in SEQ ID NO: 7. In some embodiments, in a bispecific IgG antibody in which one arm of the antibody specifically binds to BCMA, the heavy chain of the BCMA-binding arm has an amino acid sequence comprising the amino acid sequence shown in SEQ ID NO: 6, and the light chain of the BCMA-binding arm has an amino acid sequence comprising the amino acid sequence shown in SEQ ID NO: 8. In some embodiments, in a bispecific IgG antibody in which one arm of the antibody specifically binds to BCMA, the VH region of the heavy chain of the BCMA-binding arm has an amino acid sequence comprising a CDR1, a CDR2, and a CDR3 of the VH sequence shown in SEQ ID NO: 5, and the VL region of the light chain of the BCMA-binding arm has an amino acid sequence comprising a CDR1, a CDR2, and a CDR3 of the VL sequence shown in SEQ ID NO: 7.

In some embodiments, in a bispecific IgG antibody in which one arm of the antibody specifically binds to BCMA, the VH region of the heavy chain of the BCMA-binding arm has an amino acid sequence comprising the amino acid sequence: EVQLLESGGGLVQPGGSLRLS-CAASGFTFSSYPMSVVVRQAPGKGLEVVV-SAIGGSGG SLPYADSVKGRFTISRDNSKNT-LYLQMNSLRAEDTAVYYCARYWPMDIWGQGTLVTVSS (SEQ ID NO: 13). In some embodiments, in a bispecific IgG antibody in which one arm of the antibody specifically binds to BCMA, the VL region of the light chain of the BCMA-binding arm has an amino acid sequence comprising the amino acid sequence: EIVLTQSPGTLSLSPGER-ATLSCRASQSVSSTYLAWYQQKPGQAPRLLMYDA-SIRATG IPDRFSGSGSGTDFTLTISRLEPED-FAVYYCQQYQEWPLTFGQGTKVEIK (SEQ ID NO: 14). In some embodiments, in any reference herein to an antibody comprising the a VH region that has an amino acid sequence comprising the amino acid sequence shown in SEQ ID NO: 5, the antibody may alternatively comprise a VH region comprising the amino acid sequence shown in SEQ ID NO: 13. In some embodiments, in any reference herein to an antibody comprising the a VL region that has an amino acid sequence comprising the amino acid sequence shown in SEQ ID NO: 7, the antibody may alternatively comprise a VL region comprising the amino acid sequence shown in SEQ ID NO: 14. Similarly, also included herein are anti-BCMA heavy and light chains containing the VH and VL sequence of SEQ ID NO: 13 and SEQ ID NO: 14, respectively.

In some embodiments, an antibody purified according to a method provided herein may be a bispecific IgG antibody, in which one arm of the antibody specifically binds to fms-like tyrosine kinase 3 (FLT3). Information about FLT3 is provided, for example, via UniProtKB ID # P36888.

In some embodiments, in a bispecific IgG antibody in which one arm of the antibody specifically binds to FLT3, the VH region of the heavy chain of the FLT3-binding arm has an amino acid sequence comprising the amino acid sequence: EVQLLESGGGLVQPGGSLRLS-CAASGFTFSSYAMNVVVRQAPGKGLEVVVSAIS-GGGR STYYADSVKGRFTISRDNSKNTLYLQMNSL-RAEDTAVYYCARDLSPSDVGWGYGFDI WGQGTLVTVSS (SEQ ID NO: 9). In some embodiments, in a bispecific IgG antibody in which one arm of the antibody specifically binds to FLT3, the heavy chain of the FLT3-binding arm has an amino acid sequence comprising the amino acid sequence: EVQLLESGG-GLVQPGGSLRLSCAASGFTFSSYAMNVVVRQAPGK-GLEVVVSAISGGGR STYYADSVKGRFTISRDNSKNT-LYLQMNSLRAEDTAVYYCARDLSPSDVGWGYGFDI WGQGTLVTVSSASTKGPSVFPLAPCSRSTSESTAAL-GCLVKDYFPEPVTVSWNSGAL TSGVHTFPAVLQSSG-LYSLSSVVTVPSSNFGTQTYTCNVD HKPSNTKVDKTVERKCE VECPECPAPPVAGPSVFLFPPKPKDTLMISRTPE-VTCVVVAVSHEDPEVQFNWYVDG VEVHNAKTKPREEQFNSTFRWSVLT-WHQDWLNGKEYKCKVSNKGLPSSIEKTISKT KGQPREPQVYTLPPSREEMTKNQVSLTCEVKGFYPS-DIAVEWESNGQPENNYKTTPP MLDSDGSFFLYSK-LTVDKSRWQQGNVFSCSVMHEALHNHYTQKSLSL-SPG (SEQ ID NO: 10). In some embodiments, in a bispecific IgG antibody in which one arm of the antibody specifically binds to FLT3, the VH region of the heavy chain of the FLT3-binding arm has an amino acid sequence comprising a CDR1, a CDR2, and a CDR3 of the VH sequence shown in SEQ ID NO: 9.

In some embodiments, in a bispecific IgG antibody in which one arm of the antibody specifically binds to FLT3, the VL region of the light chain of the FLT3-binding arm has an amino acid sequence comprising the amino acid sequence: EIVLTQSPATLSLSPGERATLSCRASQSVSSN-LAWYQQKPGQAPRLLIYDTFTRATGIP ARFSGSGSGTDFTLTISSLEPED-FAVYYCQQYGSSPPTFGQGTRLEIK (SEQ ID NO: 11). In some embodiments, in a bispecific IgG antibody in which one arm of the antibody specifically binds to FLT3, the light chain of the FLT3-binding arm has an amino acid sequence comprising the amino acid sequence: EIVLTQSPATLSL-SPGERATLSCRASQSVSSN-LAWYQQKPGQAPRLLIYDTFTRATGIP ARFSGSGSGTDFTLTISSLEPED-FAVYYCQQYGSSPPTFGQGTRLEIKRTVAAPSVFIF PPSDEQLKSGTASWCLLNNFYPREAKVQWKVD-NALQSGNSQESVTEQDSKDSTYSL SSTLTL-SKADYEKHKVYACEVTHQGLSSPVTKSFNRGEC (SEQ ID NO: 12). In some embodiments, in a bispecific IgG antibody in which one arm of the antibody specifically binds to FLT3, the VL region of the light chain of the FLT3-binding arm has an amino acid sequence comprising a CDR1, a CDR2, and a CDR3 of the VL sequence shown in SEQ ID NO: 11.

In some embodiments, in a bispecific IgG antibody in which one arm of the antibody specifically binds to FLT3, the VH region of the heavy chain of the FLT3-binding arm has an amino acid sequence comprising the amino acid sequence shown in SEQ ID NO: 9, and the VL region of the light chain of the FLT3-binding arm has an amino acid sequence comprising the amino acid sequence shown in SEQ ID NO: 11. In some embodiments, in a bispecific IgG antibody in which one arm of the antibody specifically binds to FLT3, the heavy chain of the FLT3-binding arm has an amino acid sequence comprising the amino acid sequence shown in SEQ ID NO: 10, and the light chain of the FLT3-binding arm has an amino acid sequence comprising the amino acid sequence shown in SEQ ID NO: 12. In some embodiments, in a bispecific IgG antibody in which one arm of the antibody specifically binds to FLT3, the VH region of the heavy chain of the FLT3-binding arm has an amino acid sequence comprising a CDR1, a CDR2, and a CDR3 of the VH sequence shown in SEQ ID NO: 9, and the VL region of the light chain of the FLT3-binding arm has an amino acid sequence comprising a CDR1, a CDR2, and a CDR3 of the VL sequence shown in SEQ ID NO: 11.

In some embodiments, provided herein is a bispecific anti-BCMA/anti-CD3 antibody, in which the anti-BCMA arm of the antibody has any of the characteristics described above for an anti-BCMA arm, and the anti-CD3 arm of the antibody has any of the characteristics described above for an anti-CD3 arm. In some embodiments, provided herein is a bispecific anti-FLT3/anti-CD3 antibody, in which the anti-FLT3 arm of the antibody has any of the characteristics described above for an anti-FLT3 arm, and the anti-CD3 arm of the antibody has any of the characteristics described above for an anti-CD3 arm.

Also provided herein are methods of purifying a monospecific antibody having affinity for any of the above antigens, and/or which contain any of the amino acid sequences described above. For example, also provided herein is purification of a monospecific, homodimeric anti-CD3 antibody comprising the VH amino acid sequence as shown in SEQ ID NO: 1.

Impurities

Methods provided herein may be used to purify an antibody of interest from one or more impurities.

Impurities include, for example, clipped versions of the antibody of interest, protein aggregates, and in the case of a bispecific antibody of interest, parental monospecific antibodies related to the formation of the bispecific antibody of interest. These different impurities may also be referred to herein as different "species of impurity", "impurity molecules", or the like.

Clipped Versions of an Antibody of Interest

"Clipped versions of an antibody of interest", "clipped antibodies", or the like refer to a recombinant antibody in which one or more polypeptide bonds in the antibody has been cleaved, as compared to a corresponding intact antibody of interest. In contrast, an "intact" antibody refers to a recombinant antibody that contains all of the expected peptide bonds and amino acids of the recombinant antibody (i.e. that would be expected based on the nucleic acid sequence(s) encoding the polypeptide(s) of the antibody)

As such, clipped antibodies may be considered to be degradation products related to the antibody of interest. Cleavage of a peptide bond in an antibody may occur, for example, via enzymatic (e.g. protease-mediated) or non-enzymatic activities.

In some embodiments, when a peptide bond in a polypeptide of an antibody is cleaved, after the cleavage, a cleaved portion of the polypeptide chain might no longer be covalently linked to the rest of the antibody; in that case, the cleaved portion of the polypeptide chain may dissociate from the rest of the antibody. This most commonly occurs when the cleavage is in a peptide bond near an N or C terminus of the a polypeptide chain, and it results in a clipped antibody which has lost one or more amino acids as compared to the corresponding intact antibody. These clipped antibodies have less mass than the corresponding intact antibody, due to the loss of one or more amino acids from the antibody.

Alternatively, in some other embodiments, when a peptide bond in a polypeptide of an antibody is cleaved, after the cleavage, a cleaved portion of the polypeptide chain might still remain covalently linked to the rest of the antibody (for example, by an intra-chain or inter-chain disulfide bond). In this case, even though there is a cleavage a peptide bond of the antibody, the cleaved portion of the polypeptide chain will remain tethered to the rest of the antibody, via the remaining intact covalent bond(s) that link the cleaved portion of the polypeptide chain to the rest of the antibody. In this circumstance, the clipped antibody will still have the same number of amino acids and amino acid sequences as compared to the intact antibody. In addition, in at least some embodiments, this type of clipped antibody may have a slightly greater mass than the corresponding intact antibody. This gain of mass may be the result, for example, of one or more chemical reactions that occur upon the cleavage of the peptide bond. During such reactions, one or more atoms (e.g. H, O) may react with atoms of the antibody polypeptide chain and become covalently linked to the antibody chain, which results in a gain of mass by the clipped antibody as compared to the corresponding intact antibody.

Since a "clipped" antibody is generated from a corresponding "intact" antibody, the "clipped" version of the antibody has the same amino acid sequence (in the case of no loss of amino acids from the antibody as the result of the peptide bond cleavage) or nearly the same amino acid sequence (in the case of the loss of one or more amino acid sequences from the antibody as the result of the peptide bond cleavage) as the corresponding "intact" version of the antibody.

Typically, a clipped version of an antibody has a mass that is similar to the mass of the corresponding intact antibody. As described above, in some embodiments, a clipped antibody may have a mass that is less than the corresponding intact antibody (for example, in the event that the clipping results in the loss of one or more amino acids from the antibody). Alternatively, in some embodiments, a clipped antibody may have a mass that is greater than the corresponding intact antibody (in the event that the clipping does not result in the loss of any amino acids from the antibody, and instead, results in the gain of at least an atom by the antibody via one or more reactions that occur as a result of the cleavage of the peptide bond).

In some embodiments, a clipped version of an antibody has a mass that is no more than 50%, 40%, 30%, 25%, 20%, 15%, 10%, 5%, 4%, 3%, 2%, 1%7 0.5%, 0.4%, 0.3%, 0.2%, 0.1%, 0.05%, 0.04%, 0.03%, 0.02%, 0.01% different than the mass of the corresponding intact antibody of interest. Put another way, in some embodiments, a clipped version of an antibody of interest has a mass that differs from the mass of the corresponding intact antibody of interest by no more than 50%, 40%, 30%, 25%, 20%, 15%, 10%, 5%, 4%, 3%, 2%, 1%7 0.5%, 0.4%, 0.3%, 0.2%, 0.1%, 0.05%, 0.04%, 0.03%, 0.02%, or 0.01%.

As described above, in some embodiments, a clipped version of an antibody of interest has a mass that is less than the corresponding intact antibody of interest. For example, in some embodiments, a clipped version of an antibody has a mass that is no more than 50%, 40%, 30%, 25%, 20%, 15%, 10%, 5%, 4%, 3%, 2%, 1%7 0.5%, 0.4%, 0.3%, 0.2%, 0.1%, 0.05%, 0.04%, 0.03%, 0.02%, 0.01% less than the mass of the corresponding intact antibody of interest. In other words, if a clipped version of an antibody has a mass that is no more than 10% less than the mass of the corresponding intact antibody of interest, then, for example, if the intact antibody of interest has a mass of 100,000 Da, then the clipped version of the antibody has a mass that is no more than 10,000 Da less than that (10% of 100,000 is 10,000)—i.e. it has a mass between 90,000 and 100,000 Da.

As also described above, in some embodiments, a clipped version of an antibody of interest has a mass that is greater than the corresponding intact antibody of interest. For example, in some embodiments, a clipped version of an antibody has a mass that is no more than 5%, 4%, 3%, 2%, 1%, 0.5%, 0.4%, 0.3%, 0.2%, 0.1%, 0.05%, 0.04%, 0.03%, 0.02%, or 0.01% greater than the mass of the corresponding intact antibody of interest. In other words, if a clipped version of an antibody has a mass that is no more than 1% greater than the mass of the corresponding intact antibody of interest, then, for example, if the intact antibody of interest has a mass of 100,000 Da, then the clipped version of the antibody has a mass that is no more than 1,000 Da more than that (1% of 100,000 is 1,000)—i.e. it has a mass between 100,000 and 101,000 Da.

High Molecular Mass Species (HMMS)/Protein Aggregates

In some embodiments, an impurity relevant to a method provided herein is referred to as "high molecular mass species" (HMMS). HMMS refers to any high molecular mass contaminant or impurity, but typically is an association of at least two proteins forming an aggregate. By way of example, HMMS may include multiple molecules of an antibody of interest that have aggregated together and/or aggregates of proteins from host cells that were used to produce an antibody of interest. Aggregates may arise by any process including, for example, covalent or non-covalent linking of molecules.

Parental Antibodies

In some embodiments, an impurity relevant to a method provided herein is a "parent antibody", or "parental antibody" or the like. This type of impurity molecule is relevant to methods provided herein in which the antibody of interest is bispecific antibody that is generated from two different parent antibodies, for example, as outlined in FIG. 1. These parent antibodies are monospecific, homodimers. Parent antibodies may be present in an antibody preparation with a bispecific antibody of interest due to multiple possible mechanisms, such as: i) in some situations, some parent antibody molecules do not separate into a first arm and a second arm during the reduction step to separate parent antibodies into a separate first arm and second arm (and thus, the antibodies remain as monospecific homodimers); or ii) in some situations, a separated first arm and a second arm from the same type of parent antibody join together, such they form a monospecific homodimer (rather than being involved in forming a heterodimer bispecific antibody). As used herein "parent antibody" refers to homodimeric molecules which occur by any of the above mechanisms. In addition, an antibody preparation as provided herein may contain as an impurity a parent antibody from one or both parent species.

Purification of an Antibody of Interest from Impurities

Provided herein are methods for purifying an antibody of interest from one or more impurities.

In some embodiments, in a method provided herein, an antibody of interest is in an antibody preparation (also referred to herein as a "starting sample") that contains the antibody of interest, as well as one or more species of impurity molecule. In this starting material for a method as provided herein, the antibody of interest may comprise, for example, at least about 10%, 20%, 30%, 40%, 50%, 60%, 70%, 75%, 80%, 85%, 90%, or 95% by mass of the protein in the antibody preparation. Then, in some embodiments of a method provided herein, a purified fraction (also referred to herein as a "purified sample") is collected as eluate from the HA resin. This purified fraction contains the antibody of interest, and in some embodiments, still contains one or more impurity molecules. In some embodiments, in a purified fraction provided herein, the antibody of interest may comprise, for example, at least about 20%, 30%, 40%, 50%, 60%, 70%, 75%, 80%, 85%, 90%, 95%, 96%, 97%, 98%, or 99% by mass of the protein in the purified fraction.

In some embodiments, in a method provided herein, a starting sample is at least about 10%, 20%, 30%, 40%, 50%, 60%, 70%, 75%, 80%, 85%, 90%, or 95% by mass antibody of interest, and a subsequent purified sample in the same method is at least about 20%, 30%, 40%, 50%, 60%, 70%, 75%, 80%, 85%, 90%, 95%, 96%, 97%, 98%, or 99% by mass antibody of interest, wherein the second value is larger than the first value.

In some embodiments, in a method provided herein, a starting sample contains at least about 0.1%, 0.5%, 1%, 2%, 3%, 4%, 5%, 6%, 7%, 8%, 9%, 10%, 15%, 20%, or 25% by mass clipped version of an antibody of interest. In some embodiments, in a method provided herein, a purified sample contains no more than about 0.01%, 0.05%, 0.1%, 0.5%, 1%, 2%, 3%, 4%, 5%, 6%, 7%, 8%, 9%, 10%, 15%, or 20% by mass clipped version of an antibody of interest. In some embodiments, in a method provided herein, a starting sample contains at least about 0.1%, 0.5%, 1%, 2%, 3%, 4%, 5%, 6%, 7%, 8%, 9%, 10%, 15%, 20%, or 25% by mass clipped version of an antibody of interest, and a subsequent purified sample in the same method contains no more than about 0.01%, 0.05%, 0.1%, 0.5%, 1%, 2%, 3%, 4%, 5%, 6%, 7%, 8%, 9%, 10%, 15%, or 20% by mass clipped version of an antibody of interest, wherein the second value is smaller than the first value.

In some embodiments, in a method provided herein, a starting sample contains an intact antibody of interest and a clipped version of the antibody of interest, wherein the ratio of clipped antibody to intact antibody is at least about 1:100, 1:50, 1:25, 1:20, 1:10, 1:5, 1:4, or 1:3. In some embodiments, in a method provided herein, a purified sample contains an intact antibody of interest and a clipped version of the antibody of interest, wherein the ratio of clipped antibody to intact antibody is no more than about 1:100, 1:50, 1:25, 1:20, or 1:10. In some embodiments, in a method provided herein, a starting sample contains an intact antibody of interest and a clipped version of the antibody of interest, wherein the ratio of clipped antibody to intact antibody in the starting sample is at least about 1:100, 1:50, 1:25, 1:20, 1:10, 1:5, 1:4, or 1:3 and wherein the ratio of clipped antibody to intact antibody in a subsequent purified sample in the same method is no more than about 1:200, 1:100, 1:50, 1:25, 1:20, or 1:10, wherein the second ratio is smaller than the first ratio. In some embodiments, in a method provided herein, a starting sample contains an intact antibody of interest and a clipped version of the antibody of interest, wherein the ratio of clipped antibody to intact antibody in the starting sample is between about one of the ratios in group A (group A ratios: 1:100, 1:50, 1:25, 1:20, 1:10, 1:5, or 1:4) and one of the ratios in group B (group B ratios: 1:50, 1:25, 1:20, 1:10, 1:5, 1:4 or 1:3) and wherein the ratio of clipped antibody to intact antibody in a subsequent purified sample in the same method is no more than about 1:200, 1:100, 1:50, 1:25, 1:20, or 1:10, wherein the ratio in the purified sample is smaller than in the starting sample.

In some embodiments, a starting sample provided according to a method provided herein contains at least 1, 5, 10, 15, 20, 25, 50, 100, 200, 500, 1000, 2000, 5000, or 10,000 grams of the intact antibody of interest. In some embodiments, a purified sample provided according to a method provided herein contains at least 1, 5, 10, 15, 20, 25, 50, 100, 200, 500, 1000, 2000, 5000, or 10,000 grams of the intact antibody of interest. In some embodiments, a starting sample provided according to a method provided herein contains at least 5, 10, 15, 20, 25, 50, 100, 200, 500, 1000, 2000, 5000, or 10,000 grams of the intact antibody of interest, and a subsequent purified sample in the same method contains at least 1, 5, 10, 15, 20, 25, 50, 100, 200, 500, 1000, 2000, or 5000 grams of the intact antibody of interest, wherein the first value is larger than the second value.

In addition, any above descriptions relating to the a) the amount or b) purity of an antibody of interest in a starting sample or purified sample may be taken together in reference to the same sample. For example, as stated above, a starting sample may contain at least about 80% by mass antibody of interest; in addition, as also stated above, a starting sample may contain at least about 10 grams antibody of interest. Accordingly, also provided herein is a starting sample that contains at least about 80% by mass antibody of interest, and at least 10 grams of antibody of interest, etc.

General Techniques

The practice of the present invention will employ, unless otherwise indicated, conventional techniques of molecular biology (including recombinant techniques), microbiology, cell biology, biochemistry and immunology, which are within the skill of the art. Such techniques are explained fully in the literature, such as, Molecular Cloning: A Laboratory Manual, second edition (Sambrook et al., 1989) Cold Spring Harbor Press; Oligonucleotide Synthesis (M. J. Gait, ed., 1984); Methods in Molecular Biology, Humana Press; Cell Biology: A Laboratory Notebook (J. E. Cellis, ed., 1998) Academic Press; Animal Cell Culture (R. I. Freshney, ed., 1987); Introduction to Cell and Tissue Culture (J. P. Mather and P. E. Roberts, 1998) Plenum Press; Cell and Tissue Culture: Laboratory Procedures (A. Doyle, J. B. Griffiths, and D. G. Newell, eds., 1993-1998) J. Wiley and Sons; Methods in Enzymology (Academic Press, Inc.); Handbook of Experimental Immunology (D. M. Weir and C. C. Blackwell, eds.); Gene Transfer Vectors for Mammalian Cells (J. M. Miller and M. P. Calos, eds., 1987); Current Protocols in Molecular Biology (F. M. Ausubel et al., eds., 1987); PCR: The Polymerase Chain Reaction, (Mullis et al., eds., 1994); Current Protocols in Immunology (J. E. Coligan et al., eds., 1991); Short Protocols in Molecular Biology (Wiley and Sons, 1999); Immunobiology (C. A. Janeway and P. Travers, 1997); Antibodies (P. Finch, 1997); Antibodies: a practical approach (D. Catty., ed., IRL Press, 1988-1989); Monoclonal antibodies: a practical approach (P.

Shepherd and C. Dean, eds., Oxford University Press, 2000); Using antibodies: a laboratory manual (E. Harlow and D. Lane (Cold Spring Harbor Laboratory Press, 1999); The Antibodies (M. Zanetti and J. D. Capra, eds., Harwood Academic Publishers, 1995), as well as in subsequent editions and corresponding websites of the above references, as applicable.

The following examples are offered for illustrative purposes only, and are not intended to limit the scope of the present invention in any way. Indeed, various modifications of the invention in addition to those shown and described herein will become apparent to those skilled in the art from the foregoing description and fall within the scope of the appended claims.

EXAMPLES

Example 1: Purification of an Anti-BCMA/Anti-CD3 Bispecific Antibody by cHA Resin Chromatography Objective In this example, methods for separating a full-length bispecific human IgG of interest from various impurities were examined. The antibody of interest was a heterodimeric bispecific anti-BCMA/anti-CD3 antibody (i.e. one arm of the bispecific antibody was specific for BCMA, and the other arm was specific for CD3). The impurities present with the bispecific antibody of interest at the start of the purification included: i) a clipped version of the intact anti-BCMA/anti-CD3 bispecific antibody of interest; ii) homodimeric, monospecific anti-BCMA parent antibodies; iii) homodimeric, monospecific anti-CD3 antibodies; and iv) protein aggregates/high molecular mass species (HMMS).

Purification of the intact bispecific antibody of interest from the clipped version of the bispecific antibody presented a particular challenge, as the clipped version of the bispecific antibody contained the same number of amino acids and same amino acid sequences as the intact bispecific antibody of interest, and differed from the mass of the intact bispecific antibody by only 18 Daltons (Da). Specifically, the mass of the intact anti-BCMA/CD3 bispecific antibody is 148095.5 Da, while the mass of the corresponding clipped version of the bispecific antibody is 148113.5 (determined by mass spectrometry). Thus, the clipped bispecific antibody has a difference in mass of less than 0.1% (even less than 0.02%) as compared to the mass of the intact bispecific antibody (i.e. 0.1% of 148095 Da is 148 Da; 0.02% of 148095 Da is 29.6 Da). Put another way, the mass of the clipped bispecific antibody is about 100.01% of the mass of the intact bispecific antibody of interest. Accordingly, the mass of the clipped bispecific antibody is very similar to that of the intact bispecific antibody of interest.

The clipped version of the bispecific antibody contains a cleavage in a peptide bond of the anti-CD3 heavy chain, between the $56^{th}$ and $57^{th}$ amino acid in the heavy chain. The anti-CD3 heavy chain has an amino acid sequence as shown in SEQ ID NO: 2, and accordingly, the cleavage occurs between the amino acids R and G in the "RG" sequence of SEQ ID NO: 2 ("RG" only occurs once in SEQ ID NO: 2). It is believed that this cleavage results in the gain of 1 oxygen atom and 2 hydrogen atoms in the clipped bispecific antibody (which would correspond to the gain of mass of 18 Da), as compared to the intact bispecific antibody. Also, although there is a cleaved peptide bond in the anti-CD3 heavy chain, the cleaved 56-amino acid portion of the heavy chain (i.e. the first 56 amino acids of the chain) remains bound to the rest of the antibody via an intact, remaining intra-chain disulfide bond. The intra-chain disulfide bond is between C22 and C98 of the anti-CD3 heavy chain (i.e. C22 and C98 of the sequence shown in SEQ ID NO: 2). The continued tethering of the cleaved 56-amino acid portion to the rest of the antibody by the intra-chain peptide bond is shown schematically in FIG. 2.

Figure 2:
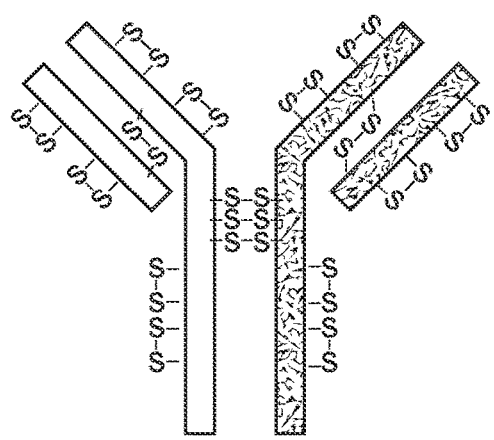
FIG. 2 depicts a schematic representation of an exemplary i) intact bispecific antibody (left side panel) and ii) clipped version of the bispecific antibody (right side panel), in which the clipped bispecific antibody is an impurity that may be present in an antibody preparation with the intact bispecific antibody.
Figure 2:
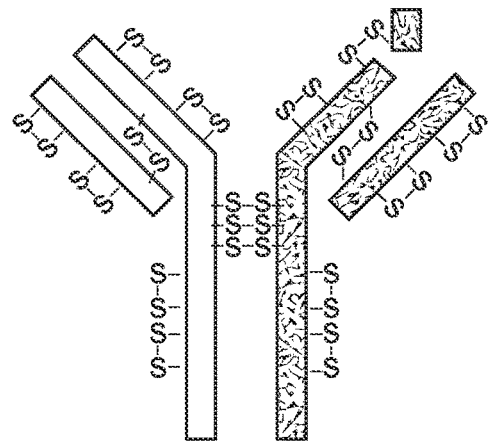

In FIG. 2, the schematic on the left depicts an intact bispecific antibody of interest, which contains intact heavy and light chains for both the anti-CD3 and anti-BCMA arms of the bispecific antibody (in the figure, the longer chains represent the heavy chains of the antibody, and the shorter chains represent the light chains). In addition, FIG. 2 also shows various intra-antibody disulfide bonds, including intra-chain disulfide bonds (e.g. linking different amino acids in the same light chain or heavy chain), and well as inter-chain disulfide bonds (e.g. linking the heavy chain of the anti-BCMA arm to the heavy chain of the anti-CD3 arm, or linking the light chain of the anti-CD3 arm to the heavy chain of the anti-CD3 arm).

Another challenge presented in developing a method of purifying the intact bispecific antibody of interest from the various impurities was the objective of developing a method that would effectively separate the bispecific antibody of interest from impurities when relatively large amounts of bispecific antibody of interest were to be purified. For example, one objective of the work related to this Example was to develop a method for purification of a bispecific antibody that would be effective for methods in which at least 1 gram of bispecific antibody was to be purified. As is known in the art, purification of proteins on a large scale frequently presents numerous difficulties that are not present (or are significantly less of a problem) during purification of the same proteins on a small scale, due to, for example, difficulties in obtaining sharp chromatographic resolution between different proteins when performing chromatography on a large scale.

Materials and Methods

The starting material for this work was an antibody preparation containing the bispecific IgG anti-BCMA/CD3 antibody of interest, as well as various impurities, such as those noted above. The amino acid sequences of the polypeptides of the bispecific antibody are shown in the following SEQ ID NOs: BCMA heavy chain: SEQ ID NO: 6; BCMA light chain: SEQ ID NO: 8; CD3 heavy chain: SEQ ID NO: 2; CD3 light chain: SEQ ID NO: 4. The bispecific antibody of interest had been prepared from two separate parent antibodies, as described previously herein. More specifically, the parent monospecific anti-CD3 and anti-BCMA antibodies had been purified via Protein-A chromatography, and these purified parent monospecific anti-CD3 and anti-BCMA antibodies had been used to generate the bispecific anti-BCMA/CD3 antibody of interest. The generated bispecific anti-BCMA/CD3 antibody had then been purified via ion exchange chromatography. The antibody preparation used as the starting material for the purification work in this Example was eluate from the ion exchange column, which contained the bispecific antibody of interest and various remaining impurities, and it had buffers/salts at an approximate concentration of: 50 mM Tris and 60 mM glycine, pH 7.5. The antibody preparation contained over 85% by mass intact bispecific antibody of interest; it also contained about 8% clipped bispecific antibody, about 1 monospecific anti-BCMA parent antibodies, about 1 monospecific anti-CD3 parent antibodies, and about 2% protein aggregates/high molecular mass species (HMMS). Thus, while the antibody preparation used as the starting material in this method contained intact bispecific antibody of interest that was already relatively pure, an objective of this method was to develop a method to increase the purity of the intact bispecific antibody.

Results

Multiple different chromatography resins and conditions were tested, in order to try to identify a suitable resin and buffer conditions that would permit the effective purification of the intact anti-BCMA/CD3 bispecific antibody of interest from the clipped bispecific antibody, the monospecific parent antibodies, and protein aggregates. During this process, for example, multiple different ion-exchange and hydrophobic interaction resins were tested, as well as various buffer and pH conditions. After extensive testing, hydroxyapatite resin was the only identified resin that could permit effective purification of the intact anti-BCMA/CD3 bispecific antibody from various impurities, including the clipped bispecific antibody.

Figure 3:
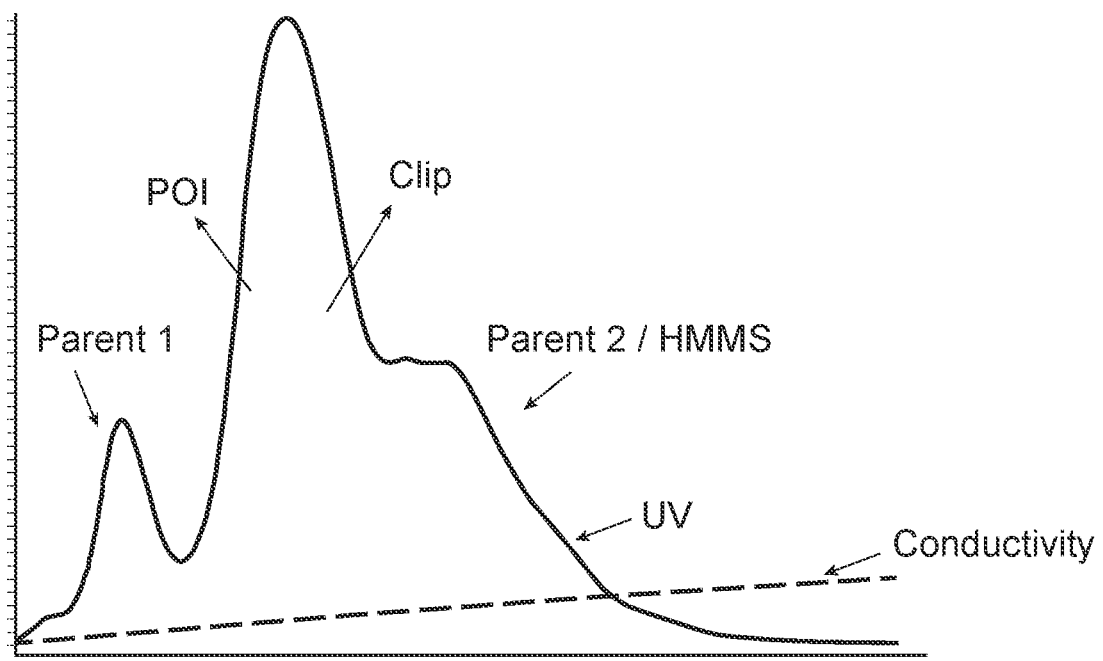
FIG. 3 depicts a chromatogram showing the separation of an anti-BCMA/anti-CD3 bispecific antibody of interest ("POI") from multiple different impurities via elution from an HA resin.

FIG. 3 shows a chromatographic profile of the elution of the bispecific antibody of interest from a ceramic hydroxyapatite ("cHA") resin column, and the concurrent separation of the anti-BCMA/CD3 bispecific antibody of interest from multiple different impurities, including the clipped version of the bispecific antibody, both parent antibody species, and high molecular mass protein species. For the chromatography run depicted in FIG. 3, the antibody preparation that was loaded onto the cHA resin was spiked with extra parent anti-BCMA and parent anti-CD3 antibodies, in order to more clearly identify the position of the elution of these molecules from the cHA column (however, no extra intact or clipped bispecific antibodies were added). In FIG. 3, the X-axis depicts, from left to right, the sequence of eluate from the cHA column (i.e. the material to the left is eluted from the cHA column earlier/at lower salt than the material to the right). Typically, the eluate is collected in sequential fractions from the column; thus, the X-axis may also be considered to depict the sequence of eluate fractions from the cHA resin column. The Y-axis depicts both UV absorbance (at 280 nM) and conductivity, as separately noted in the graph. The UV absorbance corresponds to the presence of eluted protein, and the conductivity corresponds to the salt concentration in the eluted material. Thus, FIG. 3 depicts the profile of the elution of different proteins from the cHA resin column, as the salt concentration in the elution buffer flowing through the cHA resin increases. Following the UV graph in FIG. 3 from left to right, the graph shows various peaks and shoulders, which correspond to either the intact bispecific anti-BCMA/CD3 antibody of interest, or various impurities. Specifically, from left to right, the first UV peak corresponds to the elution of the first parent antibody ("parent 1"; the monospecific anti-BCMA homodimer). The early portion of the next major peak (and the largest peak in the graph) corresponds to the intact bispecific antibody protein of interest ("POI"). The later/tail end of that same major peak corresponds to the clipped version of the bispecific antibody ("Clip"). While there is some overlap between the elution profile of the intact bispecific antibody as compared to the clipped bispecific antibody, these two antibody types elute from the cHA column under sufficiently different salt conditions and fractions in order to significantly separate the intact bispecific antibody from the clipped version of the bispecific antibody. Finally, after the clipped version of the bispecific antibody elutes, the last major peak/shoulder from the cHA column corresponds to the elution of the second parent antibody (monospecific anti-CD3 homodimer), as well as high molecular mass species ("HMMS")(also referred to as protein aggregates) from the cHA column. Thus, the graph of FIG. 3 shows that the intact anti-BCMA/CD3 antibody can be effectively purified from multiple impurities including related clipped and parental antibody species by cHA resin chromatography.

Figure 4:
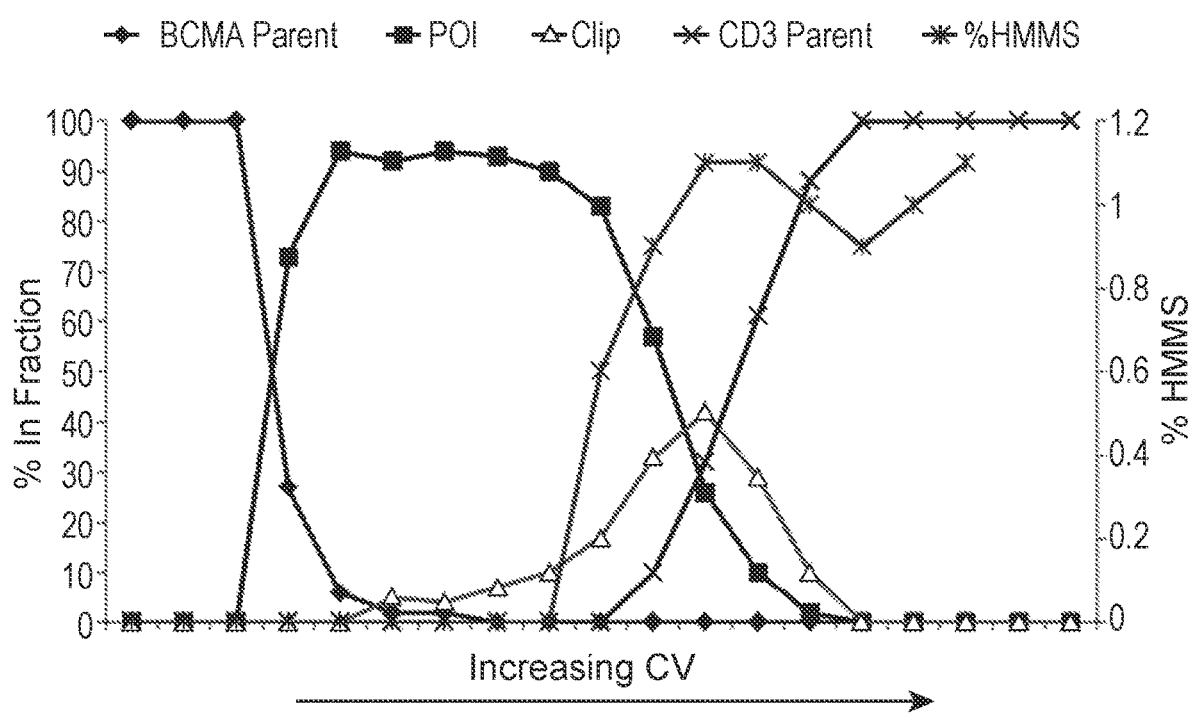
FIG. 4 depicts a graph showing the relative amounts of different protein species (including the antibody of interest and various impurities) in different fractions eluted from an HA resin according to an HA chromatography run as depicted in the chromatogram of FIG. 3.

FIG. 4 provides a graph showing more detailed information about the different molecular species present in the sequentially eluted fractions from the cHA resin column, according to the cHA elution profile depicted in FIG. 3. Specifically, FIG. 4 provides detailed information about the relative amounts of: i) the intact anti-BCMA/CD3 bispecific antibody protein of interest ("POI"); ii) the clipped version of the bispecific antibody; iii) the first parent antibody/the monospecific anti-BCMA antibody; iv) the second parent antibody/the monospecific anti-CD3 antibody; and v) high molecular mass species ("HMMS") in the different fractions eluted from the cHA column. The X-axis of FIG. 4 depicts, from left to right, the sequence of eluate from the cHA column (i.e. from low salt to high salt; each data point indicates a fraction eluted from the column). The Y-axis of FIG. 4 depicts, on the left side, the percentage of each of i) the intact anti-BCMA/CD3 bispecific antibody protein of interest ("POI"); ii) the clipped version of the bispecific antibody; iii) the first parent antibody/the monospecific anti-BCMA antibody; and iv) the second parent antibody/the monospecific anti-CD3 antibody in each fraction. The Y-axis of FIG. 4 depicts, on the right side, the % HMMS in each fraction.

The method as used to generate the data in FIG. 3 was also used with an antibody preparation that had not been spiked with any additional antibodies; data from this chromatography run is presented in FIG. 5. Thus, the data in FIG. 5 reflects the purification via cHA resin of a typical antibody preparation eluted from an ion exchange column during the preparation of anti-BCMA/CD3 bispecific antibodies, which contains primarily intact anti-BCMA/CD3 bispecific antibody of interest, as well as various impurities, including the clipped version of the bispecific antibody. In FIG. 5, the X-axis depicts, from left to right, the sequence of eluted material from the cHA column. The Y-axis depicts both UV absorbance (at 280 nM) and conductivity, as separately noted in the graph. The Parent 1 and Parent 2 peaks are smaller in FIG. 5 than in FIG. 3, because the sample loaded on the cHA column for FIG. 5 was not spiked with additional Parent 1 and Parent 2 antibody (whereas for FIG. 3, the sample was spiked with additional Parent 1 and Parent 2 antibody).

FIG. 6 provides a graph showing additional information about recovery of the intact anti-BCMA/CD3 bispecific antibody of interest from the cHA resin, as well as the relative amount of clipped bispecific antibody in various eluted fractions from the cHA resin. The X-axis depicts, from left to right, the sequence of eluate from the cHA column (i.e. from low salt to high salt; each data point indicates a fraction eluted from the column). Along the vertical/Y-axis, three different variables are plotted for each fraction: Variable 1)(diamonds): the cumulative intact bispecific antibody recovery ("% POI"), which is the total amount of intact anti-BCMA/CD3 bispecific antibody (i.e. the protein of interest) recovered from the cHA column through that fraction in the chromatography run (put another way, it is as if all of material eluted from the cHA column during the run up to and including that fraction are collected and pooled, and then the total amount of intact anti-BCMA/CD3 bispecific antibody in that pooled material is measured); also, the "% POI" value is presented as the percentage of the total amount of the intact anti-BCMA/CD3 bispecific antibody/protein of interest that was loaded onto the cHA column which has been recovered (i.e. rather than being presented as a value in grams). Variable 2)(squares): the % of the protein in each respective fraction which is the clipped bispecific antibody ("% Clip"). Variable 3)(triangles): the cumulative clipped bispecific antibody recovery ("Cumulative Clip"), which is the total amount of clipped bispecific antibody recovered from the cHA column through that fraction in the chromatography run. In addition, in the FIG. 6 graph, the left side Y-axis lists values for the % POI, and the right side Y-axis lists values for % Clip.

FIG. 6 also contains information showing how certain different fractions in FIG. 6 correspond to different points in the UV absorbance in the chromatography profile as shown in FIG. 5. So, for example, FIG. 5 shows that the largest peak of UV absorbance/protein elution from the cHA resin corresponds to the protein of interest/intact anti-BCMA/CD3 bispecific antibody. The top of this large peak of UV absorbance/protein elution from the cHA column is also referred to as the "Apex" of the run; the chromatography fraction peak corresponding to this Apex point is noted on FIG. 6. Then, various points after the Apex peak are also notated in FIG. 6. These points are "90%", "80%", "70%", "60%", and "50%", and they are calculated as follows. The UV absorbance value at the Apex is set as the starting point for additional calculations. Then, the UV value which is 90% of the Apex UV value is determined. The 90% Apex UV value which occurs after the Apex UV value is achieved during the chromatography run (i.e. towards the tail end of the peak) is noted as the "90%" fraction; it may also be referred to herein as the "90% post Post Apex" fraction, or the like. This process is repeated for the 80%, 70%, 60%, and 50% values (i.e. each of these values is further down the tail end from the peak, and thus represents an increasingly large amount of collected material). As FIG. 6 shows, as the % of the Apex value decreases, the % Clip in the fractions increases. This is consistent with the process in which the clipped bispecific antibody elutes from the cHA column at a later time/under higher salt conditions than the intact anti-BCMA/CD3 bispecific antibody. Accordingly, if a larger fraction of the Apex peak is collected, (i.e. to a lower % post Peak Apex fraction), then more clipped bispecific antibody will also be collected, due to the partial overlap between the elution profiles of the intact bispecific antibody and the clipped bispecific antibody.

Various values from FIG. 6 are also provided below in Table 1. As shown in Table 1, according to the cHA purification method provided herein, for example, if the 90% post Peak Apex eluate from the cHA column is collected (i.e. the POI % recovery through the "90% post Peak Apex" fraction), then 54% of the intact bispecific antibody/protein of interest that was loaded onto the cHA column is recovered, and this recovered protein pool contains 0% clipped bispecific antibody. In another example, if the 50% post Peak 30 Apex eluate from the cHA column is collected (i.e. the POI % recovery through the "50% post Peak Apex" fraction), then 74% of the intact bispecific antibody/protein of interest that was loaded onto the cHA column is recovered, and this recovered protein pool contains 0.2% clipped bispecific antibody. Accordingly, as shown in FIG. 6 and Table 1, robust purification of the intact bispecific antibody of interest from the clipped bispecific antibody can be effectively achieved via a cHA resin.

TABLE 1

| Peak Pool | % POI | % Cumulative Clip |
|---|---|---|
| Peak Apex | 34 | 0 |
| 90% post Peak Apex | 54 | 0 |
| 80% post Peak Apex | 61 | 0.1 |
| 70% post Peak Apex | 67 | 0.1 |
| 60% post Peak Apex | 70 | 0.2 |
| 50% post Peak Apex | 74 | 0.2 |

For the cHA chromatography results as shown in FIGS. 3-6, the cHA chromatography was performed as follows. The antibody preparation containing the bispecific anti-BCMA/CD3 antibody of interest and various impurities was loaded onto a chromatography column containing a cHA resin. The cHA resin was cHA Type 1, 40 μM bead size (Bio-Rad). For the chromatography runs depicted in FIGS. 3 and 4, the cHA resin was loaded with sample to a protein density on the cHA resin of 30 g/L. For the chromatography runs depicted in FIGS. 5 and 6, the cHA resin was loaded with sample to a protein density on the cHA resin of 10 g/L. Before loading sample onto the cHA resin, the resin was pre-equilibrated with 5 column volumes of Equilibration Buffer 1, followed by 5 column volumes of Equilibration Buffer 2. The composition of the various buffers described in this method are listed below in Table 2. The antibody preparation containing the partially purified bispecific anti-BCMA/CD3 antibody of interest was loaded onto the cHA resin column in a Load Buffer containing approximately 50 mM Tris and 60 mM glycine, pH 7.5. After the antibody preparation was loaded onto the cHA resin column, the column was then washed with 3 column volumes of Wash Buffer. Then, the bispecific antibody of interest (i.e. the intact bispecific antibody) was eluted from the cHA resin using a 20 column volumes of Elution Buffer, in which the sodium phosphate concentration in the Elution Buffer was increased from 40 mM to 80 mM over the course of the elution. As shown in FIGS. 3-6, the various impurities that were present in the antibody preparation with the bispecific antibody of interest also elute from the cHA column in response to the Elution Buffer, but they do so under sufficiently different salt concentrations from the intact anti-BCMA/CD3 bispecific antibody of interest, such that the intact bispecific antibody can be effectively separated from the various impurities, including the clipped version of the intact bispecific antibody.

After the protein of interest is eluted from the cHA resin column by the Elution Buffer according to the protocol described above, the cHA resin may then be stripped with 5 column volumes Strip Buffer, followed by sanitization with 5 column volumes Sanitization Buffer, followed by 5 column volumes of Storage Buffer.

For each of the above analyses of different material eluted from the cHA column, the type and amount of the different molecular species in various fractions/pools was determined by analytical cation exchange (CEX) analysis.

TABLE 2

| Buffer Name | Composition | Column Volume(s) |
|---|---|---|
| Equilibration Buffer 1 | 400 mM sodium phosphate, pH 7.5 | 5 |
| Equilibration Buffer 2 | 20 mM HEPES, 2 mM sodium phosphate, pH 7.5 | 5 |
| Load Buffer | Protein pool in approximately 50 mM Tris, 60 mM glycine, adjusted to pH 7.5; | N/A |

TABLE 2-continued

| Buffer Name | Composition | Column Volume(s) |
|---|---|---|
| Wash Buffer | 20 mM HEPES, 40 mM sodium phosphate | 3 |
| Elution Buffer | 20 column volume gradient from 40-100 mM sodium phosphate | 20 |
| Strip Buffer | 400 mM sodium phosphate, pH 7.5 | 5 |
| Sanitization Buffer | 500 mM potassium phosphate, 1M sodium hydroxide | 5 |
| Storage Buffer | 100 mM sodium hydroxide | 5 |

Example 2: Purification of an Anti-BCMA/Anti-CD3 Bispecific Antibody by cHA Resin Chromatography—Mass Loading Challenges Objective The objective in this example was to determine whether the bispecific antibody purification method described in Example 1 could be effectively used with various cHA resin column mass loading challenges. For example, a specific objective was to determine whether, for various mass loading challenges on the cHA resin column, it would be possible to consistently recover more than 50% of the input bispecific antibody, while at the same time having no more than 1% clipped bispecific antibody as impurity in the recovered, purified bispecific antibody product.

Materials and Methods

The materials and methods for this Example were the same as in Example 1, except that the cHA resin was loaded with antibody preparation sample to a protein density on the cHA resin (in different chromatography runs) of 8 g/L, 10 g/L, or 12 g/L.

Results

The results from these chromatography runs are summarized below in Table 3. For all 3 of the chromatography runs, the 90% post Peak Apex material (as described in Example 1) was collected and analyzed. As shown in Table 3, for each of the 8 g/L, 10 g/L, and 12 g/L mass challenges, over 50% of the loaded intact bispecific antibody was recovered as purified bispecific antibody, and the recovered purified bispecific antibody product contained less than 1% clipped bispecific antibody as an impurity.

Thus, these experiments show that the intact bispecific antibody of interest can be consistently effectively separated from the clipped bispecific antibody by cHA resin chromatography, at various cHA resin mass loading challenges.

TABLE 3

| Mass Challenge | Cumulative POI Recovery | Cumulative Clip |
|---|---|---|
| 8 grams/liter | 56% | 0.4 |
| 10 grams/liter | 58% | 0.5 |
| 12 grams/liter | 58% | 0.8 |

Example 3: Purification of an Anti-BCMA/Anti-CD3 Bispecific Antibody by cHA Resin Chromatography—Different pH Challenges Objective The objective in this example was to determine whether the bispecific antibody purification method described in Example 1 could be could be effectively performed under different pH conditions.

Materials and Methods

The materials and methods for this Example were the same as in Example 1, except that the pH of the buffers used throughout the method was pH 7.0, pH 7.5, or pH 8.0 (in different chromatography runs). For these chromatography runs, the cHA resin was loaded with antibody preparation sample to a protein density of 30 g/L on the cHA resin.

Results

The results from these chromatography runs are summarized below in Table 4. For all 3 of the chromatography runs, the Peak Apex material (as described in Example 1) was collected and analyzed. As shown in Table 4, the intact bispecific antibody protein of interest was successfully recovered for each of the different tested pH conditions, and pH 7.5 yielded the highest recovery of the protein of interest. (The amount of clipped bispecific antibody in the purified material was not separately determined for these chromatography runs.)

Thus, these experiments show that the intact bispecific antibody of interest can be effectively purified by cHA resin chromatography at different pH conditions.

TABLE 4

| Buffer pH | Cumulative POI Recovery |
|---|---|
| 7.0 | 30% |
| 7.5 | 40% |
| 8.0 | 20% |

Example 4: Purification of an Anti-FLT3/Anti-CD3 Bispecific Antibody by cHA Resin Chromatography Objective The objective of this example was to determine whether the bispecific antibody purification method described in Example 1 could be effectively performed with a different bispecific antibody than used in Example 1, in which there also was a need to separate an intact bispecific antibody of interest from various impurities, including a related clipped bispecific antibody of similar mass. In this example, the antibody of interest was a heterodimeric bispecific anti-FLT3/anti-CD3 antibody.

Materials and Methods

The heterodimeric bispecific anti-FLT3/anti-CD3 antibody used in this example contained the same anti-CD3 heavy chain and light chain as in Example 1. The amino acid sequences of the polypeptides in the FLT3 arm of the bispecific antibody are shown in the following SEQ ID NOs: FLT3 heavy chain: SEQ ID NO: 10; FLT3 light chain: SEQ ID NO: 12.

The clipped version of the bispecific antibody in the example had a clip in the same position of the anti-CD3 heavy chain as described in Example 1.

The materials and methods for this Example were the same as in Example 1, except that that, as described above, the antibody preparation sample contained bispecific anti-FLT3/anti-CD3 antibody. The cHA resin was loaded with antibody preparation sample to protein density on the cHA resin of 10 g/L.

Results

FIG. 7 shows a graph that provides information about the recovery of the intact bispecific anti-FLT3/CD3 antibody of interest from the cHA resin, as well as the relative amount of clipped bispecific antibody in various eluted fractions from the cHA resin. The X-axis depicts, from left to right, the sequence of eluate from the cHA column (i.e. from low salt to high salt; each data point indicates a fraction eluted from the column). Along the vertical/Y-axis, three different variables are plotted for each fraction: Variable 1)(diamonds): % POI; Variable 2)(squares): % Clip; and Variable 3)(triangles), each of which was determined as described in Example 1 for FIG. 6. In addition, in the FIG. 7 graph, the left side Y-axis lists values for the % POI, and the right side Y-axis lists values for % Clip. FIG. 7 also contains information showing how certain different fractions in FIG. 7 correspond to different points in the UV absorbance in the corresponding chromatography profile (not shown). The points notated as "Apex", "85%", and "60%" were determined in the same way as described for FIG. 6.

Various values from FIG. 7 are also provided below in Table 5. As shown in Table 5, the cHA resin purification method provided herein permits, for example, the recovery of over 80% intact bispecific anti-FLT3/CD3 antibody of interest, while having less than 1% clipped bispecific antibody in the purified antibody product.

Accordingly, as shown in the FIG. 7 and Table 5, purification of intact bispecific anti-FLT3/CD3 from the clipped bispecific antibody can be effectively achieved via a cHA resin.

TABLE 5

| Peak Pool | % POI | % Cumulative Clip |
| --- | --- | --- |
| Peak Apex | 55 | 0.2 |
| 85% post Peak Apex | 72 | 0.4 |
| 60% post Peak Apex | 82 | 0.7 |

Although the disclosed teachings have been described with reference to various applications, methods, kits, and compositions, it will be appreciated that various changes and modifications can be made without departing from the teachings herein and the claimed invention below. The foregoing examples are provided to better illustrate the disclosed teachings and are not intended to limit the scope of the teachings presented herein. While the present teachings have been described in terms of these exemplary embodiments, the skilled artisan will readily understand that numerous variations and modifications of these exemplary embodiments are possible without undue experimentation. All such variations and modifications are within the scope of the current teachings.

All references cited herein, including patents, patent applications, papers, text books, and the like, and the references cited therein, to the extent that they are not already, are hereby incorporated by reference in their entirety. In the event that one or more of the incorporated literature and similar materials differs from or contradicts this application, including but not limited to defined terms, term usage, described techniques, or the like, this application controls.

The foregoing description and Examples detail certain specific embodiments of the invention and describes the best mode contemplated by the inventors. It will be appreciated, however, that no matter how detailed the foregoing may appear in text, the invention may be practiced in many ways and the invention should be construed in accordance with the appended claims and any equivalents thereof.

It is understood that wherever embodiments are described herein with the language "comprising," otherwise analogous embodiments described in terms of "consisting of" and/or "consisting essentially of" are also provided.

Where aspects or embodiments of the invention are described in terms of a Markush group or other grouping of alternatives, the present invention encompasses not only the entire group listed as a whole, but each member of the group individually and all possible subgroups of the main group, but also the main group absent one or more of the group members. The present invention also envisages the explicit exclusion of one or more of any of the group members in the claimed invention.

Unless otherwise defined, all technical and scientific terms used herein have the same meaning as commonly understood by one of ordinary skill in the art to which this invention belongs. In case of conflict, the present specification, including definitions, will control. Throughout this specification and claims, the word "comprise," or variations such as "comprises" or "comprising" will be understood to imply the inclusion of a stated integer or group of integers but not the exclusion of any other integer or group of integers. Unless otherwise required by context, singular terms shall include pluralities and plural terms shall include the singular. Any example(s) following the term "e.g." or "for example" is not meant to be exhaustive or limiting. The term "or" when used in the context of a listing of multiple options (e.g. "A, B, or C") shall be interpreted to include any one or more of the options, unless the context clearly dictates otherwise.

Exemplary methods and materials are described herein, although methods and materials similar or equivalent to those described herein can also be used in the practice or testing of the present invention. The materials, methods, and examples are illustrative only and not intended to be limiting.

It is claimed:

1. A composition comprising at least two proteins, an intact anti-BCMA/anti-CD3 bispecific antibody and a clipped version of the bispecific antibody, wherein
(a) the bispecific antibody comprises an anti-BCMA arm and an anti-CD3 arm, the anti-CD3 arm comprises a VH region comprising an amino acid sequence as shown in SEQ ID NO: 1 and a VL region comprising an amino acid sequence as shown in SEQ ID NO: 3, and the anti-BCMA arm comprises a VH region comprising an amino acid sequence as shown in SEQ ID NO: 5 and a VL region comprising an amino acid sequence as shown in SEQ ID NO: 7;
(b) the clipped version of the bispecific antibody has a molecular mass that is less than 1% different from the intact bispecific antibody;
and that the composition comprises at least 90% by mass of the intact bispecific antibody of the proteins in the composition, and 0.1 to 5% by mass of the clipped version of the bispecific antibody of the proteins in the composition.

2. The composition of claim 1, wherein in the clipped version of the bispecific antibody has the same amino acid sequences as the intact bispecific antibody, except that the peptide bond between amino acid residue 56 and amino acid residue 57 of the N terminal of the VH region of the CD3 arm of the clipped version of the bispecific antibody is cleaved, and the clipped off 56 amino acid portion of the VH region of the CD3 arm of the clipped version of the bispecific antibody remains bound to the rest of the clipped version of the bispecific antibody through a disulfide bond.

3. The composition of claim 2, wherein the clipped version of the bispecific antibody has a molecular mass that is 18 Dalton more than the intact bispecific antibody.

4. The composition of claim 1, wherein the composition comprises at least 95% by mass of the intact bispecific antibody of the proteins in the composition.

5. The composition of claim 1, wherein the composition comprises at least 95% by mass of the intact bispecific antibody of the proteins in the composition, and 0.1 to 3% by mass of the clipped version of the bispecific antibody of the proteins in the composition.

6. A composition comprising at least two proteins, an intact anti-BCMA/anti-CD3 bispecific antibody and a clipped version of the bispecific antibody, wherein
(a) the bispecific antibody comprises an anti-BCMA arm and an anti-CD3 arm, the anti-CD3 arm comprises a heavy chain comprising an amino acid sequence as shown in SEQ ID NO: 2 and a light chain comprising an amino acid sequence as shown in SEQ ID NO: 4, and the anti-BCMA arm comprises a heavy chain comprising an amino acid sequence as shown in SEQ ID NO: 6 and a light chain comprising an amino acid sequence as shown in SEQ ID NO: 8;
(b) the clipped version of the bispecific antibody has a molecular mass that is less than 1% different from the intact bispecific antibody;
and that the composition comprises at least 90% by mass of the intact bispecific antibody of the proteins in the composition, and 0.1 to 5% by mass of the clipped version of the bispecific antibody of the proteins in the composition.

7. The composition of claim 6, wherein the clipped version of the bispecific antibody has the same amino acid sequences as the intact bispecific antibody, except that the peptide bond between amino acid residue 56 and amino acid residue 57 of the N terminal of the VH region of the CD3 arm of the clipped version of the bispecific antibody is cleaved, and the clipped off 56 amino acid portion of the VH region of the CD3 arm of the clipped version of the bispecific antibody remains bound to the rest of the clipped version of the bispecific antibody through a disulfide bond.

8. The composition of claim 7, wherein the clipped version of the bispecific antibody has a molecular mass that is 18 Dalton more than the intact bispecific antibody.

9. The composition of claim 6, wherein the composition comprises at least 95% by mass of the intact bispecific antibody of the proteins in the composition.

10. The composition of claim 6, wherein the composition comprises at least 95% by mass of the intact bispecific antibody of the proteins in the composition, and 0.1 to 3% by mass of the clipped version of the bispecific antibody of the proteins in the composition.

11. A method of purifying an antibody preparation comprising at least two proteins, an intact anti-BCMA/anti-CD3 bispecific antibody and a clipped version of the bispecific antibody, wherein:
(a) the anti-CD3 arm of the intact bispecific antibody comprises (i) a VH region comprising an amino acid sequence as shown in SEQ ID NO: 1 and a VL region comprising an amino acid sequence as shown in SEQ ID NO: 3, or (ii) a heavy chain comprising an amino acid sequence as shown in SEQ ID NO: 2 and a light chain comprising an amino acid sequence as shown in SEQ ID NO: 4;
(b) the anti-BCMA arm of the intact bispecific antibody comprises (i) a VH region comprising an amino acid sequence as shown in SEQ ID NO: 5 and a VL region comprising an amino acid sequence as shown in SEQ ID NO: 7, or (ii) a heavy chain comprising an amino acid sequence as shown in SEQ ID NO: 6 and a light chain comprising an amino acid sequence as shown in SEQ ID NO: 8, and
(c) that the clipped version of the bispecific antibody has a molecular mass that is less than 1% different from the intact bispecific antibody;
comprising the steps of:
A) loading the antibody preparation in a load buffer onto a hydroxyapatite (HA) resin; and
B) eluting the intact antibody of interest from the HA resin with an elution buffer.

12. The method of claim 11, wherein in the clipped version of the bispecific antibody has the same amino acid sequences as the intact bispecific antibody, except that the peptide bond between amino acid residue 56 and amino acid residue 57 of the N terminal of the VH region of the CD3 arm of the clipped version of the bispecific antibody is cleaved, and the clipped off 56 amino acid portion of the VH region of the CD3 arm of the clipped version of the bispecific antibody chain remains bound to the rest of the clipped version of the bispecific antibody through a disulfide bond.

13. The method of claim 12, wherein the clipped version of the bispecific antibody has a molecular mass that is 18 Dalton more than intact bispecific antibody.

14. The method of claim 11, wherein the HA resin is ceramic hydroxyapatite (cHA) resin.

15. The method of claim 11, wherein after loading the antibody preparation onto the HA resin but prior to eluting the intact bispecific antibody the resin is washed with a wash buffer comprising phosphate ions at concentration between 10 and 50 mM.

16. The method of claim 11, wherein the elution buffer comprises phosphate ions at a concentration of of 36-44 mM, 45-55 mM or 54-66 mM.

17. The method of claim 11, wherein the elution buffer comprises phosphate ions at a concentration increased during the elution from 40 mM to 100 mM.

18. The method of claim 11, wherein the pH of at least one of the load buffer, wash buffer, and elution buffer is at or between pH 7.0 and 8.0.

19. The method of claim 11, wherein the antibody preparation contains proteins that were previously loaded onto and eluted from at least one of: i) a protein A resin and ii) an ion exchange resin.

* * * * *